United States Patent
Guerra et al.

(10) Patent No.: US 12,346,314 B1
(45) Date of Patent: Jul. 1, 2025

(54) INTELLIGENT QUERY RESPONSE IN ERP SYSTEMS USING GENERATIVE AI

(71) Applicant: SAP SE, Walldorf (DE)

(72) Inventors: Rodrigo Guerra, Schwetzingen (DE); Rudolf Wenzler, Besigheim (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/774,702

(22) Filed: Jul. 16, 2024

(51) Int. Cl.
*G06F 7/00* (2006.01)
*G06F 16/23* (2019.01)
*G06F 16/242* (2019.01)

(52) U.S. Cl.
CPC ........ *G06F 16/2428* (2019.01); *G06F 16/235* (2019.01); *G06F 16/243* (2019.01)

(58) Field of Classification Search
CPC ... G06F 16/2428; G06F 16/235; G06F 16/243
USPC .................. 707/759, 770, E17.001, E17.062
See application file for complete search history.

(56) References Cited

U.S. PATENT DOCUMENTS

| | | | | |
|---|---|---|---|---|
| 11,972,223 | B1* | 4/2024 | DeFoor | G06N 20/00 |
| 12,216,692 | B1* | 2/2025 | Rogynskyy | G06F 16/334 |
| 2008/0059604 | A1* | 3/2008 | Brunnabend | G06Q 10/00 709/201 |
| 2024/0202539 | A1* | 6/2024 | Poirier | G06F 16/345 |
| 2024/0320421 | A1* | 9/2024 | Bursztyn | G06F 40/56 |
| 2025/0061279 | A1* | 2/2025 | deLevie | G06F 40/131 |

OTHER PUBLICATIONS

Reiss, "SAP UX Innovations in Public Cloud Products, Joule, AI, Entry Points, Apple Vision Pro and more," https://community.sap.com/t5/technology-blogs-by-sap/sap-ux-innovations-in-public-cloud-products-joule-ai-entry-points-apple/ba-p/1359454, 55 pages, Jun. 2, 2024.
Artificial Intelligence, Joule, https://www.sap.com/products/artificial-intelligence/ai-assistant.html, 9 pages (accessed Jun. 6, 2024).

* cited by examiner

*Primary Examiner* — Md I Uddin
(74) *Attorney, Agent, or Firm* — Klarquist Sparkman, LLP

(57) ABSTRACT

A computer-implemented method for intelligent query response in an enterprise resource planning (ERP) system is disclosed. The method can receive, from a user interface of the ERP system, a natural language user query for processing data of a target object and invoke a function call through an application programming interface of the ERP system based on the user query. Invoking the function call includes extract denormalized data from one or more database tables, generating a prompt using a prompt template and the denormalized data, prompting a large language model using the prompt, and receiving a response generated by the large language model. The method can generate an output on the user interface based on the response generated by the large language model. Related systems and software for implementing the method are also disclosed.

16 Claims, 13 Drawing Sheets

INTELLIGENT QUERY RESPONSE IN ERP SYSTEMS USING GENERATIVE AI

BACKGROUND

Enterprise resource planning (ERP) is software that allows an organization to use a system of integrated applications to manage their business and automate many back-office functions related to technology, services and human resources. Some ERP systems, such as S/4HANA provided by SAP SE, of Walldorf, Germany, offer artificial intelligence (AI) solutions to add value to customers. Integration of AI in ERP systems can potentially enhance automation, data analysis, and decision-making. Recent advancements in generative AI, such as large language models (LLMs), offer exciting new possibilities for ERP systems. By leveraging generative AI, organizations can automate content creation, improve customer interactions, and enhance decision-making processes. However, integrating generative AI into ERP systems presents unique challenges. For example, existing generative AI models are typically pretrained on public data and lack the ability to understand or interpret the specific database (DB) information maintained within an organization's ERP system. This disconnect can lead to outputs that are not aligned with the organization's data or business context, limiting the effectiveness of the AI. Thus, room for improvement exists for embedding generative AI in ERP systems.

DETAILED DESCRIPTION

Overview of Generative AI in ERP Systems

The integration of generative AI into ERP systems presents a transformative opportunity for organizations. By leveraging the power of LLMs, organizations can automate content creation, improve customer interactions, and enhance decision-making processes. Non-technical users can leverage these capabilities simply by describing their business tasks in natural language, eliminating the need for extensive technical expertise. An example integration is SAP Joule, an AI assistant designed to streamline interactions with SAP S/4HANA ERP system. SAP Joule serves as a central interaction point, discerning between different topics and enabling developers to have an "in-house" control of topic determination. It allows users to interact with the system using natural language, making complex tasks more accessible and intuitive.

While the integration of generative AI into ERP systems offers transformative opportunities, it also presents unique technical challenges. A significant issue is that existing generative AI models, typically pretrained on public data, do not have access to or understanding of the specific databases maintained by the ERP system. These databases often contain critical business information that is necessary for the AI to generate meaningful responses to user queries. However, even when the database tables are provided to the AI, without contextual information about these tables, the AI may find it difficult to interpret the data accurately. This disconnect between the AI's general pretraining and the specific knowledge encapsulated in the ERP system's databases can result in outputs that are misaligned with the organization's data or business context, thereby limiting the AI's effectiveness.

Another technical challenge emerges when users attempt to make changes to database tables via the AI. In many ERP systems, certain modifications to the database tables may be prohibited to maintain data integrity and adhere to security policies. However, a generative AI model, lacking an inherent understanding of these restrictions, might inadvertently attempt to proceed with the changes. This could potentially lead to conflicts with the system's data policies or even pose a risk of data corruption.

The technologies described herein address the challenges of integrating generative AI into ERP systems. Through prompt engineering, the disclosed technologies can dynamically retrieve data from database tables and metadata, and embed this information into prompt templates to guide the generative AI in generating intelligent, contextually relevant responses to user queries. Furthermore, the prompts are configured to prevent unintended user actions, ensuring alignment with the system's data policies and security protocols. This approach uses a standardized architecture which bridges the gap between the generative AI and the ERP system, paving the way for a more seamless and efficient integration.

Figure 1:
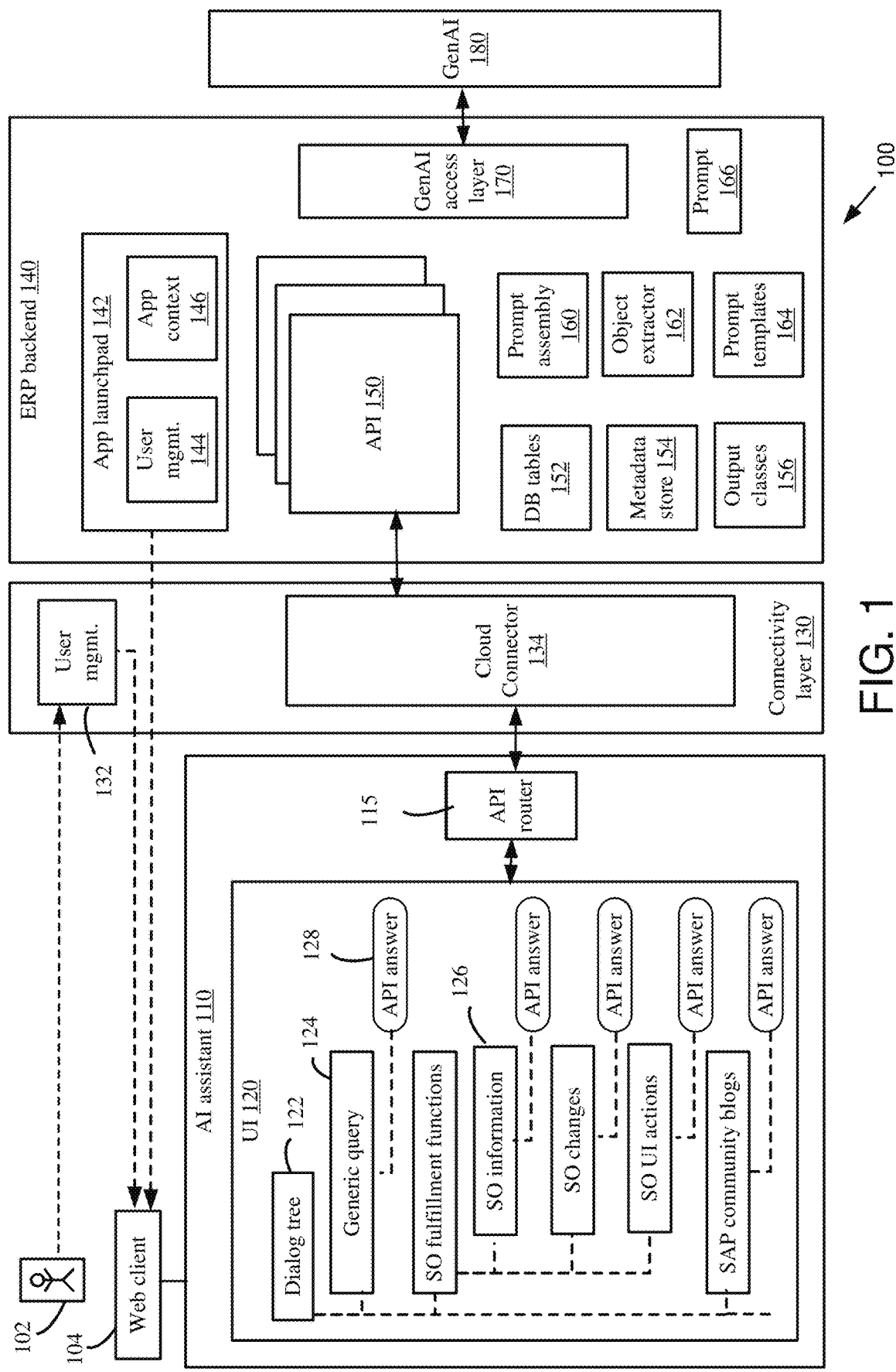
FIG. 1 is an overall block diagram of an example ERP system which can generate intelligent query response using generative AI.

Example ERP Systems Supporting Intelligent Query Responses Using Generative AI FIG. 1 shows an overall block diagram of a standardized application programming interface (API) architecture which allows integration of an example ERP system 100 with generative AI.

As shown, the ERP system 100 includes an AI assistant 110 operating as a frontend of the ERP system 100, an ERP backend 140 which can reside in a cloud environment, and a connectivity layer 130 connecting the AI assistant 110 to the ERP backend 140. A user 102 can interact the ERP system 100 through a web client 104, which is a browser-based interface providing a user-friendly and intuitive platform for accessing various applications and services offered by the ERP system 100.

The ERP backend 140 can include an application launch pad 142, which is a platform that hosts various applications (including the AI assistant 110) available in the ERP system 100 and provides a centralized location for users to access and launch the applications they need. The application launch pad 142 can have a user management unit 144 and application context data 146. The application context data 146 can contain contextual information about the applications in the ERP system 100. The user management unit 144 can store registration information of users who are authorized to access the applications and ensure that users can only access the data and functions relevant to their roles. For example, the web client 104 can coordinate with a user management proxy 132 in the connectivity layer 130 and the user management unit 144 to control user access to the AI assistant 110. Specifically, when the user 102 attempts to access the AI assistant 110, the user management proxy 132 can verify the user's credentials and checks the user's access rights in the user management unit 144.

In some examples, the AI assistant 110 can be represented as a chatbot, such as SAP Joule, and is connected to a user interface (UI) 120, through which the user 102 can enter queries to the ERP system 100 in natural language and receive intelligent responses generated by the ERP system 100.

In some examples, the AI assistant 110 can generate a dialog tree 122 in the UI 120, which defines the flow of the conversation between the user 102 and the ERP system 100. The dialog tree 122 can have a logical tree structure including a plurality of dialog nodes 124. For example, a dialog node 124 can have zero, one or more sub-nodes 126. Each dialog node or sub-node represents a unit of dialog that is executed when a specific condition is fulfilled.

In some examples, user queries can be analyzed by the AI assistant 110 using natural language processing techniques (e.g., named entity recognition, LLM, etc.) to detect the user's intent and target objects or entities maintained by the ERP system 100. For example, the AI assistant 110 may identify, from the user query, that the user 102 intends to perform sales order (SO) fulfillment function, such as retrieving information of a specific SO object, making changes to a specific SO object, or taking specific UI actions (e.g., access a specific SO via a hyperlink, etc.). As another example, the AI assistant 110 may determine, from the user query, that the user 102 intends to search specific topics in SAP community blogs. In yet another example, the AI assistant 110 may determine that the user query is a generic question which can be directly answered without accessing a target object.

In some examples, the AI assistant 110 can have a built-in API router 115, which is responsible for invoking the appropriate APIs 150 in the ERP backend 140 based on the user's intent. The API router 115 communicates with the APIs 150 via a cloud connector 134 in the connectivity layer 130. The cloud connector 134 acts as an intermediary, ensuring secure and efficient communication between the AI assistant 110 and the ERP backend 140.

The APIs 150 can be designed to handle functions in different domains or line of businesses (LOBs). For instance, one API might be dedicated to handling functions in the sales and distribution domain, such as managing sales orders, billing documents, shipping documents, invoices, etc. Another API might be designed to handle functions in the accounting domain, such as managing depreciation keys, tax documents, etc. As described further below, the API router 115 not only can map each user query into a corresponding API 150 based on the intent specified in the user query, but also pass relevant information, such as the user intent, target objects, and the full text of the user query, as an input to the corresponding API 150. This input could be in a structured format, such as a JSON structure.

In some examples, each API can operate in several modes, each corresponding to a specific intent specified in the user prompt. For example, one operation mode might be to retrieve information from a target object, another mode might be to retrieve process flow (also referred to as "document flow") information involving a target object, and yet another mode might be to change data values in a target object.

For each mode, the API 150 can dynamically extract, in runtime, relevant data of the target object from one or more database tables 152 of the ERP system 100. Additionally, the API 150 can dynamically extract, in runtime, metadata of the target object from a metadata store 154. In some examples, this data extraction can be performed by an object extractor 162 residing on the ERP backend 140. The object extractor 162 can be a software artifact (e.g., a class or a function) configured to retrieve and organize the necessary data and metadata from the database tables 152 and metadata store 154, respectively, based on the specific requirements of the user's query and the operation mode of the API 150.

In some examples, the API 150 is configured to dynamically generate, in runtime, a prompt 166 using a prompt template 164 that is specific to the operation mode of the API 150. Prompt generation can be performed by a prompt assembly proxy 160, which embeds data retrieved from the database tables 152 and metadata store 154 into the corresponding prompt template 164. The prompt assembly proxy 160 can be a software artifact (e.g., a class or a function) configured to assemble the prompt 166 in runtime.

The API 150 can send the prompt 166, via a generative AI (GenAI) access layer 170, to a pretrained generative AI model 180. As described herein, the GenAI access layer 170 can be configured to interface with different generative AI models (e.g., via different application programming interfaces), such as the LLM described more fully below. The generative AI model 180 can be hosted externally (e.g., on a third-party platform) or deployed locally on the ERP system 100.

The response generated by the generative AI model 180 can be formatted according to predefined output classes 156 supported by the UI 120, such as simple text, buttons, lists, cards, media files, etc. In some cases, the API 150 can validate the response generated by the generative AI model 180. For example, the API 150 can check the generative AI response to ensure that any changes to the target object are allowed. After validation, the final output of the API 150 can be presented as an API answer 128 in response to the user query in the UI 120.

In practice, the systems shown herein, such as the ERP system 100, can vary in complexity, with additional functionality, more complex components, and the like. For example, there can be additional functionality within the ERP backend 140. Additional components can be included to implement security, redundancy, load balancing, report design, data logging, and the like.

The described computing systems can be networked via wired or wireless network connections, including the Internet. Alternatively, systems can be connected through an intranet connection (e.g., in a corporate environment, government environment, or the like).

The ERP system 100 and any of the other systems described herein can be implemented in conjunction with any of the hardware components described herein, such as the computing systems described below (e.g., processing units, memory, and the like). In any of the examples herein, user queries, prompt templates, prompts, database tables, metadata, and the like can be stored in one or more computer-readable storage media or computer-readable storage devices. The technologies described herein can be generic to the specifics of operating systems or hardware and can be applied in any variety of environments to take advantage of the described features.

Example API for Intelligent Query Responses

Figure 2:
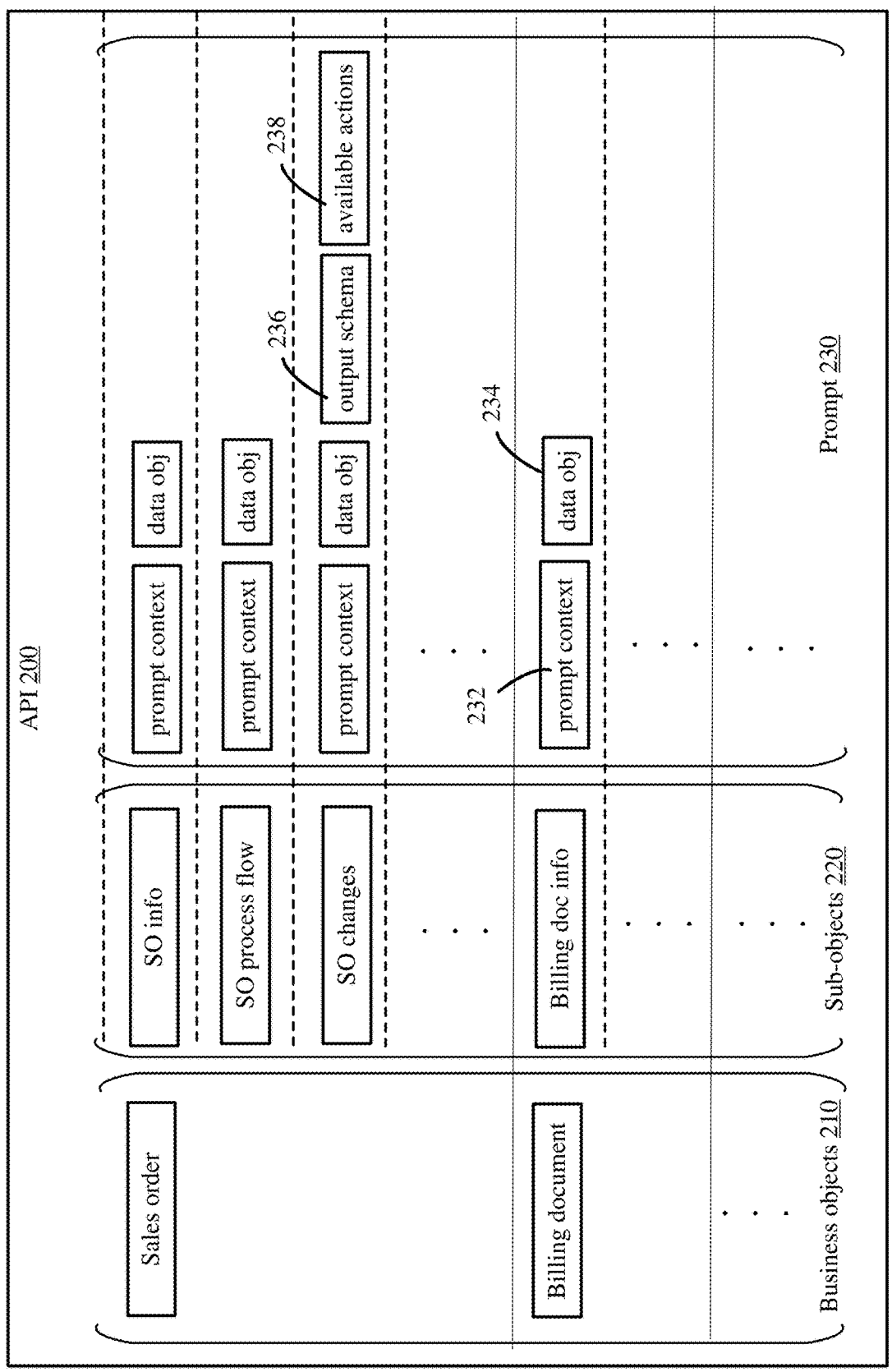
FIG. 2 is a block diagram depicting various objects defined in an example application programming interface of the ERP system of FIG. 1.

As an example, FIG. 2 schematically depicts objects included in an API 200 that can be configured to handle functions in the sales and distribution domain of an ERP system. The API 200 can be one of the APIs 150 depicted in FIG. 1. Similar APIs can be designed for other domains of the ERP system. As described above, the API 200 can be invoked by the API router, which also provides the full text of the user query and the identified user intent and target object to the API 200.

As shown, the API 200 can define a plurality of business objects 210, such as a sales order object, a billing document object, etc. The target object identified from the user query can be mapped to one of the business objects 210. For example, if the user query specifies a particular sales order (identified as a target object), the API 200 can map the user query to the sales order object.

Each business object 210 can have one or more sub-objects 220, each of which defines an operation mode of the API 200. For example, the sales order object can have a SO information sub-object defining an operation mode to retrieve information from a specific sales order object, a SO process flow sub-object defining an operation mode to obtain processing status of a specific sales order object, a SO changes sub-object defining an operation mode to change content of a specific sales order object, etc. In this way, the user query, based on the identified intent, can be mapped to a specific sub-object 220 or operation mode within the relevant business object 210 (the horizontal dashed lines in FIG. 2 separate different operation modes).

For each selected operation mode corresponding to a specific business object, the API 200 can dynamically assemble, in runtime, a prompt 230. As described above, each prompt 230 can be assembled by inserting data and metadata dynamically extracted from database tables and a metadata store into a corresponding prompt template.

Depending on the selected business object and operation mode, components of the prompt 230 can vary. For example, while the prompt for the SO information sub-object includes a prompt context object 232 and a data object 234, the prompt for the SO changes sub-object includes a prompt context object 232, a data object 234, an output schema object 236, and an available actions object 238.

The prompt context objects 232 contain contextual information specific to each sub-object 220. In other words, for different operation modes of a business object, the prompt context objects 232 can be different. For example, the prompt context object for the SO information sub-object might contain specific task instructions on how to extract information from a sales order object, whereas the prompt context object for the SO changes sub-object might contain specific task instructions on rules for changing content of a sales order object.

In FIG. 2, each data object 234 can encapsulate data and metadata dynamically extracted from one or more database tables and the metadata store. Although the database tables and metadata store may contain normalized data (e.g., to reduce data redundancy), the extracted data and metadata can be denormalized (e.g., in a delimiter-separated values format) so that they can be more interpretable by the generative AI model.

In some examples, a prompt context object 232 can represent a prompt template, as in the cases of the SO information sub-object and SO process flow sub-object. In some examples, a prompt template can include a prompt context object 232, an output schema object 236, and an available actions object 238. Because each operation mode has a specific prompt context object 232, the prompt templates are also specific to the operation modes.

Given a user query, the API 200 can send the assembled prompt 230 to a generative AI model (e.g., the generative AI model 180), which in turn can generate response that is specific to the user's intent and the target object, thereby providing a tailored answer or action based on the user's query.

Example Overview of LLMs and Prompts

Generative AI models, foundation models, and LLMs are interconnected concepts in the field of AI. Generative AI, a broad term, encompasses AI systems that generate content such as text, images, music, or code. Unlike discriminative AI models that aim to make decisions or predictions based on input data features, generative AI models focus on creating new data points. Foundation models are a subset of these generative AI models, serving as a starting point for developing more specialized models. LLMs, a specific type of generative AI, work with language and can understand and generate human-like text. In the context of generative AI, including LLMs, a prompt serves as an input or instruction that informs the AI of the desired content, context, or task. This allows users to guide the AI to produce tailored responses, explanations, or creative content based on the provided prompt.

In any of the examples herein, an LLM can take the form of an AI model that is designed to understand and generate human language. Such models typically leverage deep learning techniques such as transformer-based architectures to process language with a very large number (e.g., billions) of parameters. Examples include the Generative Pre-trained Transformer (GPT) developed by OpenAI, Bidirectional Encoder Representations from Transforms (BERT) by Google, A Robustly Optimized BERT Pretraining Approach developed by Facebook AI, Megatron-LM of NVIDIA, or the like. Pretrained models are available from a variety of sources.

In any of the examples herein, prompts can be provided, in runtime, to LLMs to generate responses. Prompts in LLMs can be input instructions that guide model behavior. Prompts can be textual cues, questions, or statements that users provide to elicit desired responses from the LLMs. Prompts can act as primers for the model's generative process. Sources of prompts can include user-generated queries, predefined templates, or system-generated suggestions. Technically, prompts are tokenized and embedded into the model's input sequence, serving as conditioning signals for subsequent text generation. Experiment with prompt variations can be performed to manipulate output, using techniques like prefixing, temperature control, top-K sampling, chain-of-thought, etc. These prompts, sourced from diverse inputs and tailored strategies, enable users to influence LLM-generated content by shaping the underlying context and guiding the neural network's language generation. For example, prompts can include instructions and/or examples to encourage the LLMs to provide results in a desired style and/or format.

Example Architecture of LLM

Figure 3:
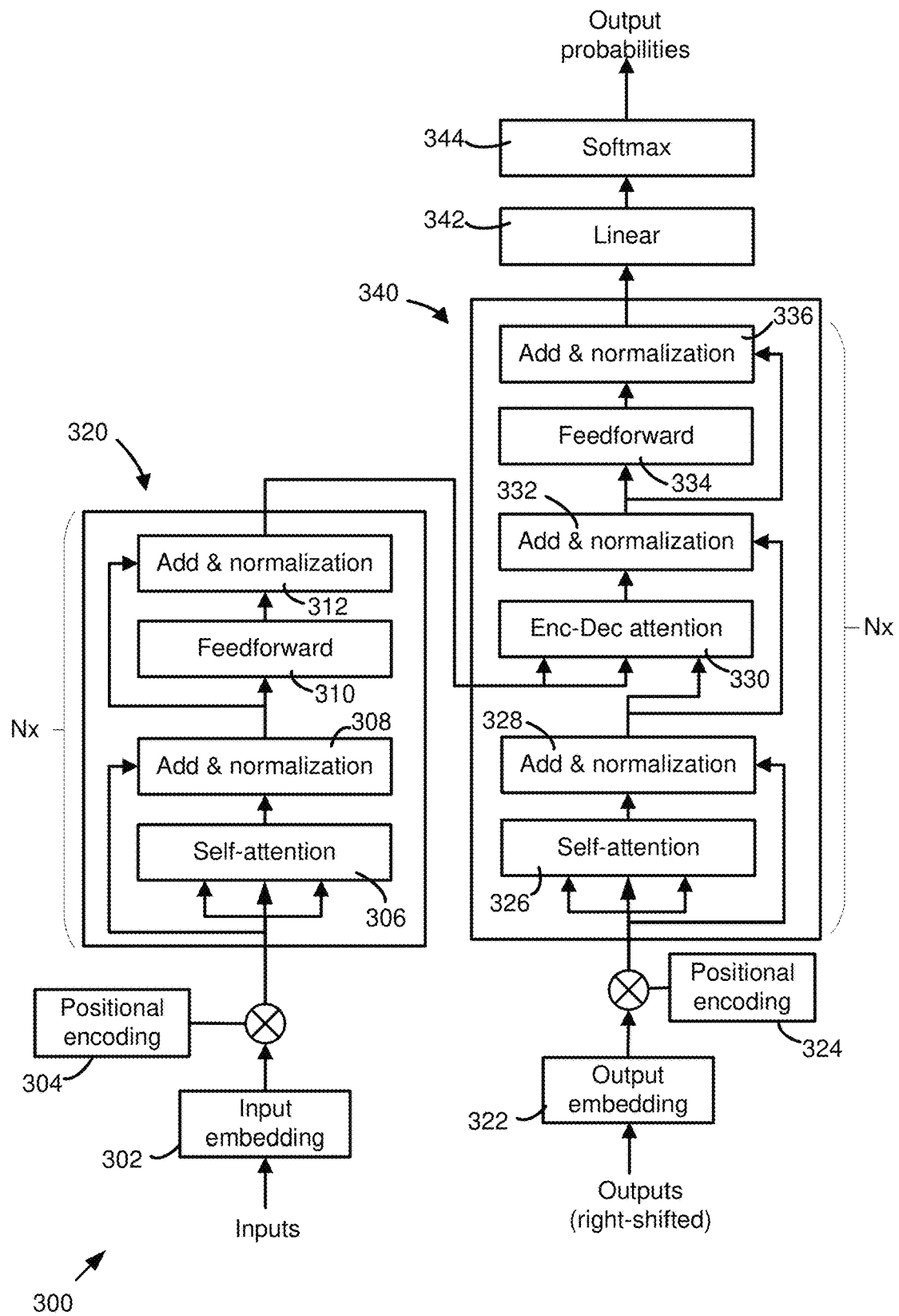
FIG. 3 is an architecture diagram of an example large language model.

FIG. 3 shows an example architecture of an LLM 300, which can be used as the external generative AI model 180 of FIG. 1.

In the depicted example, the LLM 300 uses an autoregressive model (as implemented in OpenAI's GPT) to generate text content by predicting the next word in a sequence given the previous words. The LLM 300 can be trained to maximize the likelihood of each word in the training dataset, given its context.

As shown in FIG. 3, the LLM 300 can have an encoder 320 and a decoder 340, the combination of which can be referred to as a "transformer." The encoder 320 processes input text, transforming it into a context-rich representation. The decoder 340 takes this representation and generates text output.

For autoregressive text generation, the LLM 300 generates text in order, and for each word it generates, it relies on the preceding words for context. During training, the target or output sequence, which the model is learning to generate, is presented to the decoder 340. However, the output is right shifted by one position compared to what the decoder 340 has generated so far. In other words, the model sees the context of the previous words and is tasked with predicting the next word. As a result, the LLM 300 can learn to generate text in a left-to-right manner, which is how language is typically constructed.

Text inputs to the encoder 320 can be preprocessed through an input embedding unit 302. Specifically, the input embedding unit 302 can tokenize a text input into a sequence of tokens, each of which represents a word or part of a word. Each token can then be mapped to a fixed-length vector known as an input embedding, which provides a continuous representation that captures the meaning and context of the text input. Likewise, to train the LLM 300, the targets or output sequences presented to the decoder 340 can be preprocessed through an output embedding unit 322. Like the input embedding unit 302, the output embedding unit 322 can provide a continuous representation, or output embedding, for each token in the output sequences.

Generally, the vocabulary in LLM 300 is fixed and is derived from the training data. The vocabulary in LLM 300 consists of tokens generated above during the training process. Words not in the vocabulary cannot be output. These tokens are strung together to form sentences in the text output.

In some examples, positional encodings (e.g., 304 and 324) can be performed to provide sequential order information of tokens generated by the input embedding unit 302 and output embedding unit 322, respectively. Positional encoding is needed because the transformer, unlike recurrent neural networks, process all tokens in parallel and do not inherently capture the order of tokens. Without positional encoding, the model would treat a sentence as a collection of words, losing the context provided by the order of words. Positional encoding can be performed by mapping each position/index in a sequence to a unique vector, which is then added to the corresponding vector of input embedding or output embedding. By adding positional encoding to the input embedding, the model can understand the relative positions of words in a sentence. Similarly, by adding positional encoding to the output encoding, the model can maintain the order of words when generating text output.

Each of the encoder 320 and decoder 340 can include multiple stacked or repeated layers (denoted by Nx in FIG. 3). The number of stacked layers in the encoder 320 and/or decoder 340 can vary depending on the specific LLM architecture. Generally, a higher "N" typically means a deeper model, which can capture more complex patterns and dependencies in the data but may require more computational resources for training and inference. In some examples, the number of stacked layers in the encoder 320 can be the same as the number of stacked layers in the decoder 340. In other examples, the LLM 300 can be configured so that the encoder 320 and decoder 340 can have different numbers of layers. For example, a deeper encoder (more layers) can be used to better capture the input text's complexities while a shallower decoder (fewer layers) can be used if the output generation task is less complex).

The encoder 320 and the decoder 340 are related through shared embeddings and attention mechanisms, which allow the decoder 340 to access the contextual information generated by the encoder 320, enabling the LLM 300 to generate coherent and contextually accurate responses. In other words, the output of the encoder 320 can serve as a foundation upon which the decoder network can build the generated text.

Both the encoder 320 and decoder 340 comprise multiple layers of attention and feedforward neural networks. An attention neural network can implement an "attention" mechanism by calculating the relevance or importance of different words or tokens within an input sequence to a given word or token in an output sequence, enabling the model to focus on contextually relevant information while generating text. In other words, the attention neural network plays "attention" on certain parts of a sentence that are most relevant to the task of generating text output. A feedforward neural network can process and transform the information captured by the attention mechanism, applying non-linear transformations to the contextual embeddings of tokens, enabling the model to learn complex relationships in the data and generate more contextually accurate and expressive text.

In the example depicted in FIG. 3, the encoder 320 includes an intra-attention or self-attention neural network 306 and a feedforward neural network 310, and the decoder 340 includes a self-attention neural network 326 and a feedforward neural network 334. The self-attention neural networks 306, 326 allow the LLM 300 to weigh the importance of different words or tokens within the same input sequence (self-attention in the encoder 320) and between the input and output sequences (self-attention in the decoder 340), respectively.

In addition, the decoder 340 also includes an inter-attention or encoder-decoder attention neural network 330, which receives input from the output of the encoder 320. The encoder-decoder attention neural network 330 allows the decoder 340 to focus on relevant parts of the input sequence (output of the encoder 320) while generating the output sequence. As described below, the output of the encoder 320 is a continuous representation or embedding of the input sequence. By feeding the output of the encoder 320 to the encoder-decoder attention neural network 330, the contextual information and relationships captured in the input sequence (by the encoder 320) can be carried to the decoder 340. Such connection enables the decoder 340 to access to the entire input sequence, rather than just the last hidden state. Because the decoder 340 can attend to all words in the input sequence, the input information can be aligned with the generation of output to improve contextual accuracy of the generated text output.

In some examples, one or more of the attention neural networks (e.g., 306, 326, 330) can be configured to implement a single head attention mechanism, by which the model can capture relationships between words in an input sequence by assigning attention weights to each word based on its relevance to a target word. The term "single head" indicates that there is only one set of attention weights or one mechanism for capturing relationships between words in the input sequence. In some examples, one or more of the attention neural networks (e.g., 306, 326, 330) can be configured to implement a multi-head attention mechanism, by which multiple sets of attention weights, or "heads," in parallel to capture different aspects of the input sequence. Each head learns distinct relationships and dependencies within the input sequence. These multiple attention heads can enhance the model's ability to attend to various features and patterns, enabling it to understand complex, multi-faceted contexts, thereby leading to more accurate and contextually relevant text generation. The outputs from multiple heads can be concatenated or linearly combined to produce a final attention output.

As depicted in FIG. 3, both the encoder 320 and the decoder 340 can include one or more addition and normalization layers (e.g., the layers 308 and 312 in the encoder 320, the layers 328, 332, and 336 in the decoder 340). The addition layer, also known as a residual connection, can add the output of another layer (e.g., an attention neural network or a feedforward network) to its input. After the addition operation, a normalization operation can be performed by a corresponding normalization layer, which normalizes the features (e.g., making the features to have zero mean and unit variance), This can help in stabilizing the learning process and reducing training time.

A linear layer 342 at the output end of the decoder 340 can transform the output embeddings into the original input space. Specifically, the output embeddings produced by the decoder 340 are forwarded to the linear layer 342, which can transform the high-dimensional output embeddings into a space where each dimension corresponds to a word in the vocabulary of the LLM 300.

The output of the linear layer 342 can be fed to a softmax layer 344, which is configured to implement a softmax function, also known as softargmax or normalized exponential function, which is a generalization of the logistic function that compresses values into a given range. Specifically, the softmax layer 344 takes the output from the linear layer 342 (also known as logits) and transforms them into probabilities. These probabilities sum up to 1, and each probability corresponds to the likelihood of a particular word being the next word in the sequence. Typically, the word with the highest probability can be selected as the next word in the generated text output.

Still referring to FIG. 3, the general operation process for the LLM 300 to generate a reply or text output in response to a received prompt input is described below.

First, the input text is tokenized, e.g., by the input embedding unit 302, into a sequence of tokens, each representing a word or part of a word. Each token is then mapped to a fixed-length vector or input embedding. Then, positional encoding 304 is added to the input embeddings to retain information regarding the order of words in the input text.

Next, the input embeddings are processed by the self-attention neural network 306 of the encoder 320 to generate a set of hidden states. As described above, multi-head attention mechanism can be used to focus on different parts of the input sequence. The output from the self-attention neural network 306 is added to its input (residual connection) and then normalized at the addition and normalization layer 308.

Then, the feedforward neural network 310 is applied to each token independently. The feedforward neural network 310 includes fully connected layers with non-linear activation functions, allowing the model to capture complex interactions between tokens. The output from the feedforward neural network 310 is added its input (residual connection) and then normalized at the addition and normalization layer 312.

The decoder 340 uses the hidden states from the encoder 320 and its own previous output sequence to generate the next token in an autoregressive manner so that the sequential output is generated by attending to the previously generated tokens. Specifically, the output of the encoder 320 (input embeddings processed by the encoder 320) are fed to the encoder-decoder attention neural network 330 of the decoder 340, which allows the decoder 340 to attend to all words in the input sequence. As described above, the encoder-decoder attention neural network 330 can implement a multi-head attention mechanism, e.g., computing a weighted sum of all the encoded input vectors, with the most relevant vectors being attributed the highest weights.

The previous output sequence of the decoder 340 is first tokenized by the output embedding unit 322 to generate an output embedding for each token in the output sequence. Similarly, positional embedding 324 is added to the output embedding to retain information regarding the order of words in the output sequence.

The output embeddings are processed by the self-attention neural network 326 of the decoder 340 to generate a set of hidden states. The self-attention mechanism allows each token in the text output to attend to all tokens in the input sequence as well as all previous tokens in the output sequence. The output from the self-attention neural network 326 is added to its input (residual connection) and then normalized at the addition and normalization layer 328.

The encoder-decoder attention neural network 330 receives the output embeddings processed through the self-attention neural network 326 and the addition and normalization layer 328. Additionally, the encoder-decoder attention neural network 330 also receives the output from the addition and normalization layer 312 which represents input embeddings processed by the encoder 320. By considering both processed input embeddings and output embeddings, the output of the encoder-decoder attention neural network 330 represents an output embedding which takes into account both the input sequence and the previously generated outputs. As a result, the decoder 340 can generate the output sequence that is contextually aligned with the input sequence.

The output from the encoder-decoder attention neural network 330 is added to part of its input (residual connection), i.e., the output from the addition and normalization layer 328, and then normalized at the addition and normalization layer 332. The normalized output from the addition and normalization layer 332 is then passed through the feedforward neural network 334. The output of the feedforward neural network 334 is then added to its input (residual connection) and then normalized at the addition and normalization layer 336.

The processed output embeddings output by the decoder 340 are passed through the linear layer 342, which maps the high-dimensional output embeddings back to the size of the vocabulary, that is, it transforms the output embeddings into a space where each dimension corresponds to a word in the vocabulary. The softmax layer 344 then converts output of the linear layer 342 into probabilities, each of which corresponds to the likelihood of a particular word being the next word in the sequence. Finally, the LLM 300 samples an output token from the probability distribution generated by the softmax layer 344 (e.g., selecting the token with the highest probability), and this token is added to the sequence of generated tokens for the text output.

The steps described above are repeated for each new token until an end-of-sequence token is generated or a maximum length is reached. Additionally, if the encoder 320 and/or decoder 340 have multiple stacked layers, the steps performed by the encoder 320 and decoder 340 are repeated across each layer in the encoder 320 and the decoder 340 for generation of each new token.

Example Overall Method for Intelligent Query Responses in ERP Systems

Figure 4:
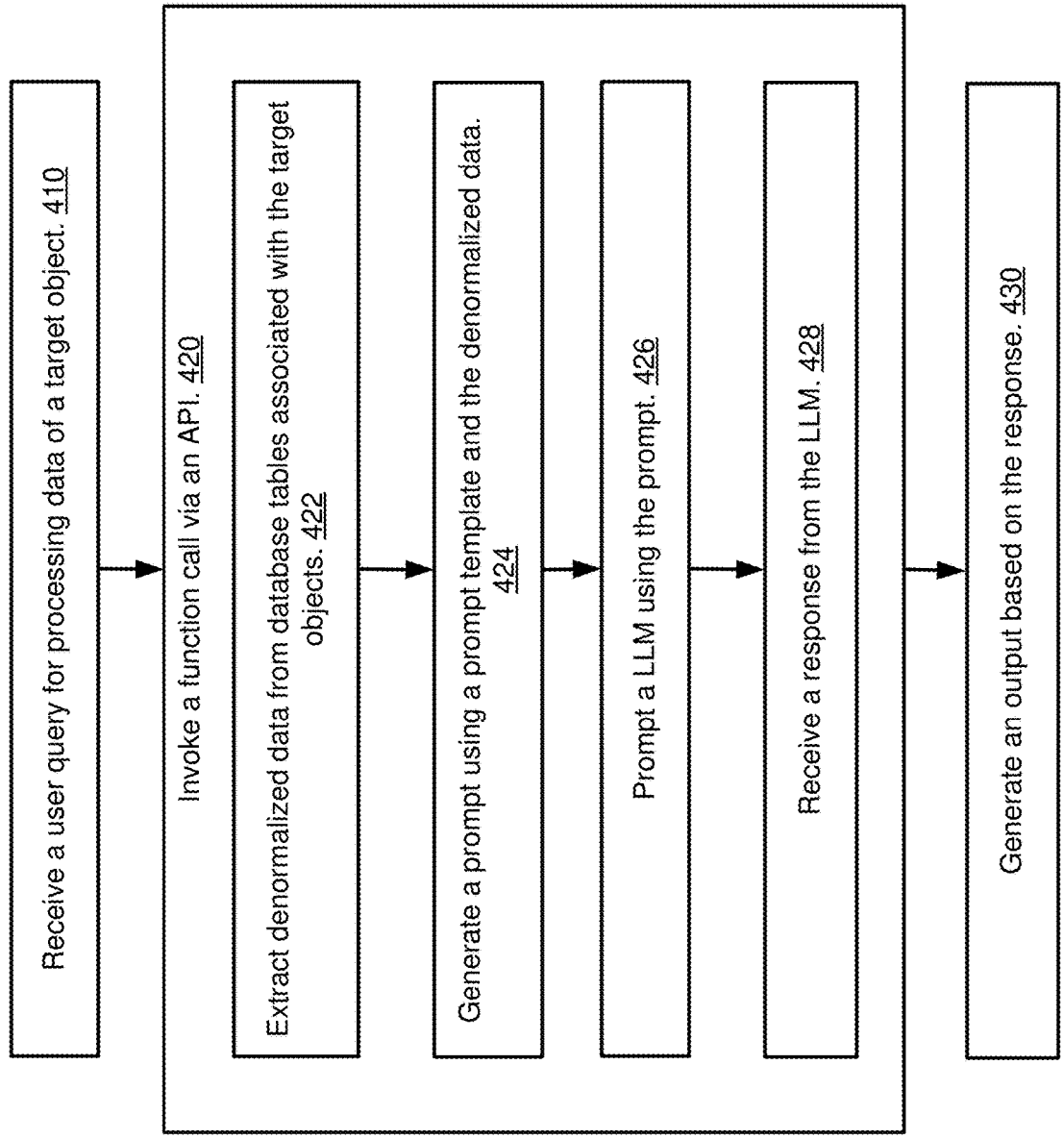
FIG. 4 is a flowchart illustrating an example overall method for generating intelligent query response in ERP systems using generative AI.

FIG. 4 is a flowchart illustrating an example overall method 400 for generating intelligent query responses in ERP systems. The method 400 can be performed, e.g., by the ERP system 100 of FIG. 1.

At step 410, the method can receive, from a user interface (e.g., the UI 120) of the ERP system, a natural language user query. In some examples, the user query can be analyzed, in runtime, to identify an intent of the user and a target object. In other words, the method can determine the user's intended data processing action on a target object that is maintained by the ERP system.

At step 420, the method can invoke, in runtime, a function call through an API of the ERP system based on the natural language user query. As described above, the invoked API can be domain specific to the user query (e.g., based on the mapping of API router 115). Additionally, the identified user intent and target object, along with the full text of the user query, can be passed to the API as input.

Invoking the function call through the API implements a series of actions. For example, at step 422, the method can extract, in runtime, denormalized data from one or more database tables associated with the target object. For example, the method can retrieve a selected number of data records from at least one of the database tables in a delimiter-separated values format.

In some examples, data extracted from the one or more database tables can be enriched by metadata extracted from a metadata store associated with the one or more database tables. Example metadata stored in the metadata store includes text descriptions of the database tables, descriptions of attributes for various fields or columns of those tables, data types for different fields, rules and restrictions on data (e.g., some fields may be labeled non-changeable, etc.). Extracting the denormalized data can include replacing, in runtime, at least some attributes or data values stored in the one or more database tables with respective text descriptions from the metadata store. In some circumstances, replacing attributes and data values with descriptive metadata can enhance the understandability of the data. This is because attributes and raw data values in the database tables may be non-descriptive. For example, a table column may have a cryptic field name (e.g., "OSDSTATUS") and/or may contain data values with specific notations (e.g., categories "A," "B," "C," or space). If such data is sent directly to a generative AI model, it may not be able to interpret the data correctly. However, by replacing these cryptic field names and data values with descriptive metadata (e.g., replacing "OSDSTATUS" with "Sales Order Overall Processing Status," and replacing categorical data value "A" with "Complete," or the like), the data becomes more meaningful and interpretable for the generative AI model to generate more contextually relevant responses.

At step 424, the method can generate, in runtime, a prompt using a selected prompt template. The prompt template includes at least one placeholder or parameter which can be replaced with the denormalized data (which can be enriched with descriptive metadata) extracted from the database when assembling the prompt.

Based on the intent of the user query, the method can select the prompt template from a plurality of prompt templates, each corresponding to a specific operation mode. For example, for an operation mode to retrieve information from a specific sales order object, the prompt template can include instructions for the generative AI model to generate a summary based on the selected number of data records. For an operation mode to obtain processing status of a specific sales order object, the prompt template can include instructions for the generative AI model to generate a list of one or more business objects (including the sales order object) and their status information in a sequential order. For an operation mode to change content of a specific sales order object, the prompt template can include instructions for the generative AI model on what actions are available, what are the rules, and what are the output formats, etc.

At step 426, the method can prompt, in runtime, a generative AI model such as an LLM using the prompt.

At step 428, the method can receive a response generated by the generative AI model.

Then, at step 430, the method can generate an output on the user interface of the ERP system based on the response generated by the generative AI model.

The method 400 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

The illustrated actions can be described from alternative perspectives while still implementing the technologies. For example, "send" can also be described as "receive" from a different perspective.

Example Use Case for Retrieval of Object Information

Figure 5:
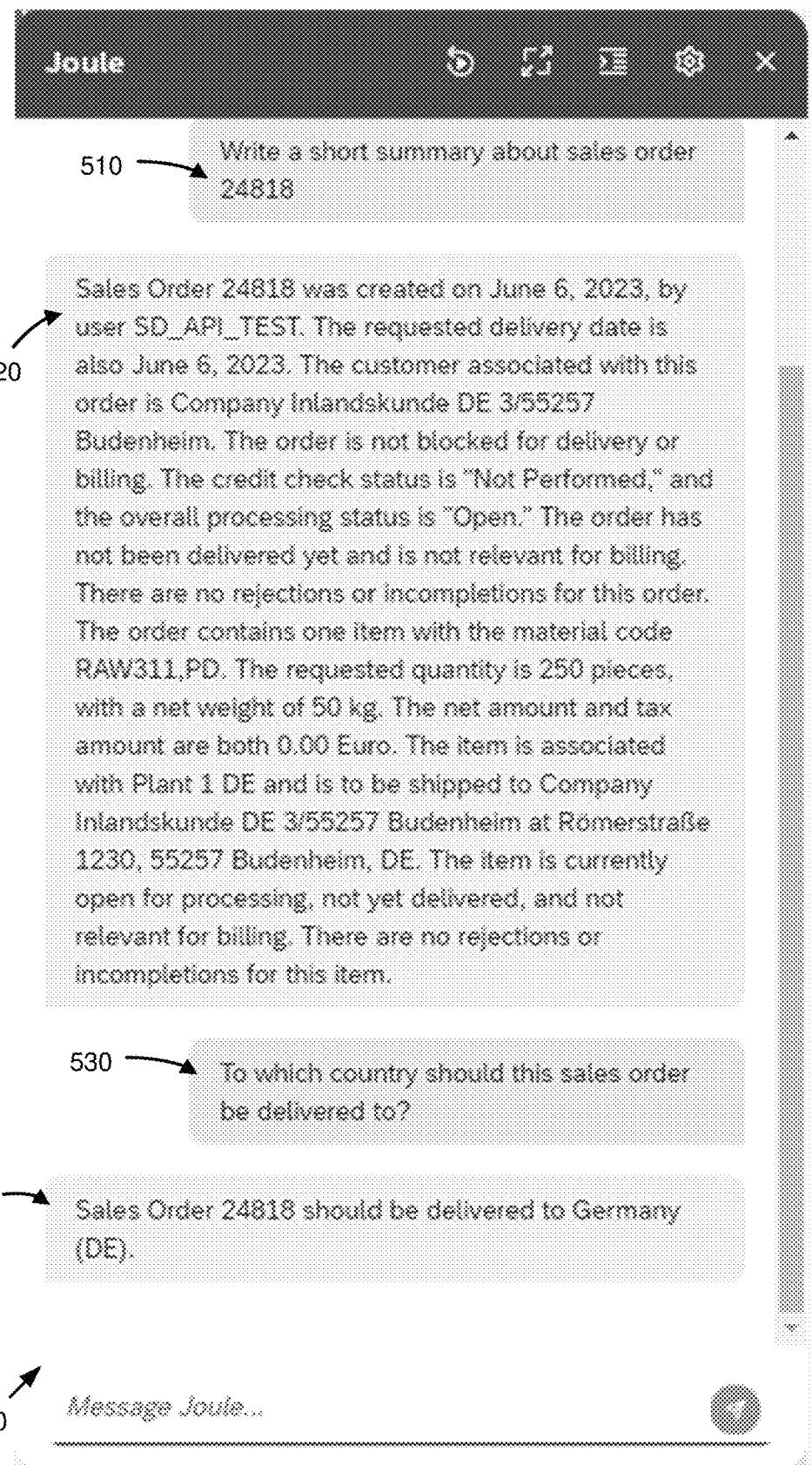
FIG. 5 depicts a use case illustrating a user's request for an example sales order information and the response generated by the ERP system.

An example use case is shown in FIG. 5, depicting a user interface 500 of an ERP system which shows a user query 510 for information about a specific sales order 24818, and the response 520 generated by the ERP system.

In this example, the SAP Joule is used as an AI assistant (like the AI assistant 110 of FIG. 1), which analyzes the user query 510 to identify the intent (information retrieval) and target object (sales order 24818). The AI assistant then invokes a method call of an API (like the API 200 of FIG. 2), passing the following JSON structure as an input to the API:

```
body: '{ "TaskFunction" : "Information",
    "SalesOrderID" : "24818",
    "UserQuery" : "Write a short summary about sales order 24818",
    "CallGenAI" : true }'
```

Here, the field "TaskFunction" defines the operation mode of the API (e.g., retrieve information), the field "SalesOrderID" defines target object (e.g., sales order 24818), and the field "UserQuery" contains the full text of the user query. The field "CallGenAI" is an optional flag controlling whether generative AI should be used in generating response to the user query and can be set to true in default settings.

Once the API receives the method call, it can automatically extract, in runtime, denormalized data from one or more database tables associated with the sales order 24818. For example, each SAP sales order can be associated with a header table storing sales order overview data (e.g., customer number, net value, etc.), an items table containing line-item data for each product in the order (e.g., partners, shipping data, etc.), and a partners table containing data about various partners involved in the transaction (e.g., sold-to party, ship-to party, etc.). Thus, the API can extract overview information from the header table, a sample list of line-item data detailing the products from the items table, and involved partners from the partners table.

In some examples, the API can extract all data that is available in the database tables. In some examples, the API can extract a sample data from those database tables. For instance, the items table may contain thousands of line-items, and the API can be configured to extract only some of the line-items, such as the first N line-items, or a randomly selected N line-items, where N is a predefined number. Extracting sample data instead of all data available in the database tables may reduce memory usage for storing the extracted data, reduce computation load (as less data included in the prompt leads to reduced workload to the generative AI model), and reduce response latency (as the generative AI model can respond faster for a shorter prompt).

Generally, database tables in a relationship database contain normalized data to reduce redundancy. As described herein, the extracted data can be denormalized to make such data more suitable for the generative AI model to interpret. For example, each row or data record extracted from a database table can be organized in comma delimited format. Usage of this format eliminates the need for specific character encoding or line terminators. It also reduces the number of words (tokens) exchanged with the generative AI model, thereby lowering the per-call usage cost of the generative AI. Additionally, as described above, the extracted data can be enriched by replacing some data values (and/or attributes) in those database tables with more descriptive metadata.

As an example, the API can extract the following header information from the header table associated with the sales order 24818:

```
SALES_DOCUMENT_ID;DOC_REQUESTED_DELIVERY_DATE;CREATED_BY_U
SER;CREATION_DATE;CUSTOMER_NAME;DELIVERY_BLOCK_STATUS;DELIV
ERY_BLOCK_REASON;BILLING_BLOCK_STATUS;BILLING_BLOCK_REASON;T
OTAL_CREDIT_CHECK_STATUS;OVERALL_PROCESSING_STATUS;OVERALL
DELIVERY_STATUS;OVERALL_BILLING_STATUS;OVERALL_REJECTION_STA
TUS;OVERALL_INCOMPLETION_STATUS
0000024818;06.06.2023;SD_API_TEST;06.06.2023;Company Inlandskunde DE 3/55257
Budenheim;Not Blocked;;Blocked;Check Payment Terms;Not Performed;Open;Not
Delivered;Not Relev. for Billg;Nothing Rejected;Complete
```

Similarly, the API can extract the following line-items data from the items table associated with the sales order 24818:

```
ITEM_ID;MATERIAL;REQUESTED_QUANTITY;REQUESTED_QUANTITY_UNIT;I
TEM_EARLIEST_REQD_DEL_DATE;NET_WEIGHT; WEIGHT_UNIT;NET_AMOUN
T;TAX_AMOUNT;CURRENCY;PLANT;SHIP_TO_NAME;SHIP_TO_STREET;SHIP
TO_POSTALCODE;SHIP_TO_CITY;SHIP_TO_COUNTRY;ITEM_PROCESSING_ST
ATUS;ITEM_DELIVERY_STATUS;ITEM_BILLING_STATUS;ITEM_REJECTION_S
TATUS;ITEM_GENINCOMPLETION_STATUS
000010;RAW311,PD;10.000 ;Piece;06.06.2023;2.000 ;kg;0.00 ;0.00 ;Euro;Plant 1
DE;Company Inlandskunde DE 3/55257 Budenheim;Römerstraße
1230;55257;Budenheim;DE;Open;Not Delivered;Not Relev. for Billg;Nothing
Rejected;Incomplete
```

The API can then assemble a prompt by inserting the extracted data into a prompt template specific to the operation mode of sales order information retrieval. One example such prompt template is provided below:

```
You: You are Joule, SAP Digital Assistant.
Task: Provide general information to the Sales Representative, based on a natural language request string and table of order items. All items refer always to a single Sales Order.
Rules:
- Always format credit, delivery and billing blocks with bold (Markdown standard);
- Summaries should be limited to 100 words;
- Avoid creating lists;
- The original field names should not be used in the response;
- This data represents this sales order's real-time data.
###AND NOW COMES THE REAL INPUT:
Sales Order Header:
<Header>{ sales_order_header }</Header>
Sales Order Items:
<Items>{ sales_order_items }</Items>
Number of Items: < ItemCount>{ number_of_items }</ItemCount:
```

In this example, the prompt template includes detailed instructions for the generative AI model, such as the task description and specific rules, e.g., bolding certain blocks, limiting summaries to 100 words, avoiding lists, and not using the original field names in the response, etc. This example prompt template has three placeholders which can be filled with data dynamically extracted from database tables associated with the sales order 24818. For example, the placeholder {sales_order_header} is replaced with header information extracted from the header table, the placeholder {sales_order_items} is replaced with line-items data extracted from the items table, and {number_of_items} is filled with the number of line-items extracted from the items table, which is one in this example.

The assembled prompt can be sent to the generative AI model, which can generate a response. In this example, the response output from the generative AI model is a summary of the sales order 24818, which can be directly passed by the API to the AI assistant for display on the user interface 500 as the response 520.

As shown in FIG. 5, the user can enter another query 530 to ask additional details of the sales order (e.g., the destination country for delivery of the sales order), and the API can use the query 530 to directly prompt the generative AI model, which can generate a response 540 based on information it already learned from processing the initial user query 510.

Example Use Cases for Retrieval of Document Flow Information

Figure 6:
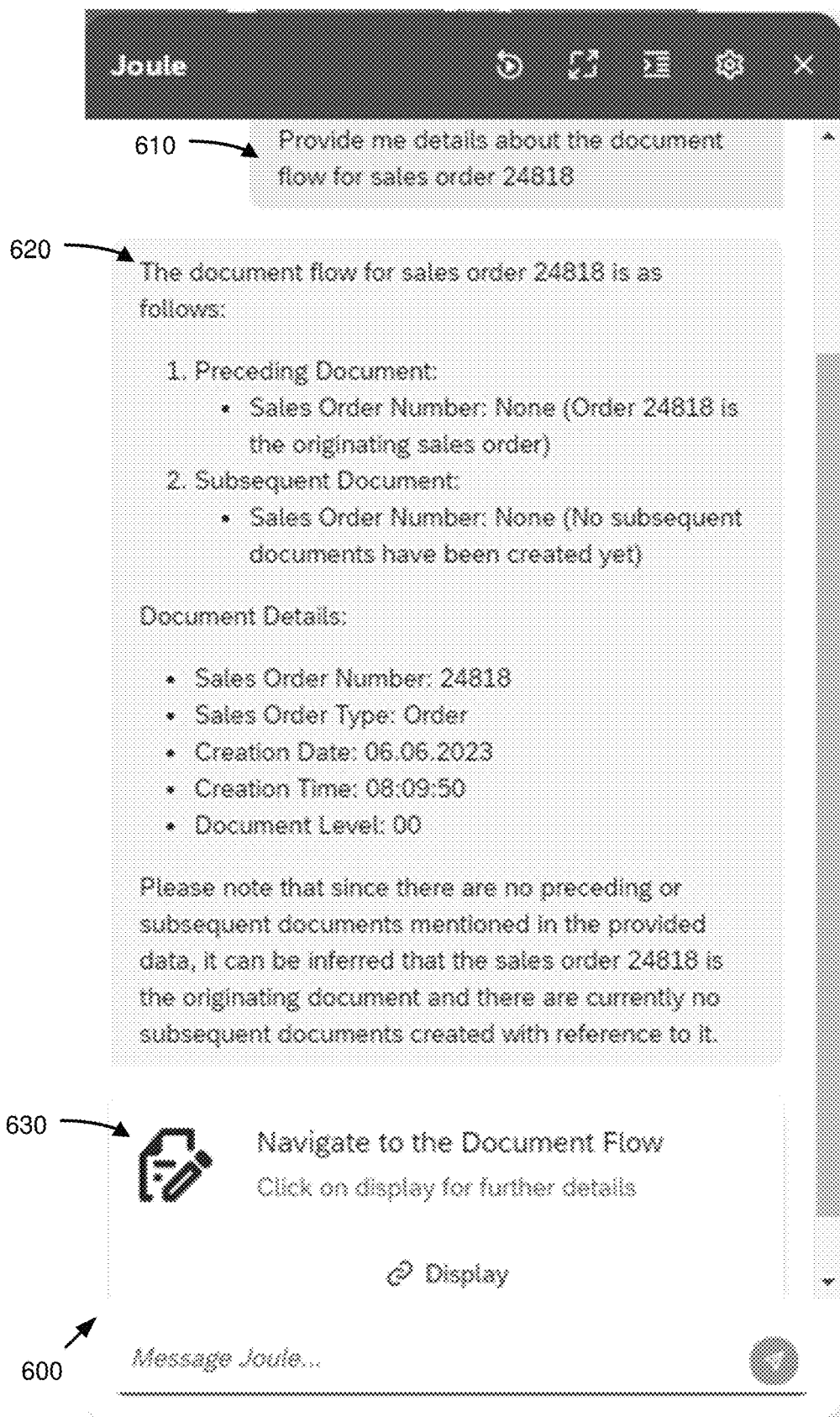
FIG. 6 depicts a use case illustrating a user's request for document flow information related to an example sales order and the response generated by the ERP system.

Another example use case is shown in FIG. 6, depicting a user interface 600 of an ERP system which shows a user query 610 for details about a document flow for a specific sales order 24818, and the response 620 generated by the ERP system.

Similarly, the SAP Joule is used as an AI assistant, which analyzes the user query 610 to identify the intent (sales order process flow) and target object (sales order 24818). The AI assistant then invokes a method call of an API, passing the following JSON structure as an input to the API:

```
body: '{ "TaskFunction" : "SODocumentFlow",
    "SalesOrderID" : "24818",
    "UserQuery" : "Provide me details about the process flow for Sales
        Order 24818",
    "CallGenAI" : true }'
```

Here, the field "TaskFunction" defines the operation mode of the API is for retrieving sales order document flow information. For this operation mode, the API can dynamically extract data from a document flow table which contains all documents related to the sales order 24818.

Similar data extraction method can be used. For example, the API can extract the following process flow information:

```
PRECEEDING_DOC_NUMBER;PRECEEDING_DOC_TYPE;DOC_NUMBER;DOC_T
YPE;CREATION_DATE;CREATION_TIME;DOCUMENT_LEVEL
;;24818;Order;06.06.2023;08:09:50;00
```

In this example, the document flow table associated with the sales order 24818 includes only one single document, the sales order 24818 itself (i.e., no other document has been created for this sales order).

The extracted document flow dataset can be inserted into the following prompt template that is specific to the operation mode for sales order document flow:

---

You: You are Joule, SAP Digital Assistant.
Task: This dataset provides the prerequisites for answering questions about a sales order document flow (that is, the process flow).
Rules:
- The first entry of the table refers to the originating sales order;
- All subsequent entries in the table are subsequent documents created with reference to the first one;
- If there are no precedent or subsequent documents, basically it means that the process is still open or in process- The original field names should not be used in the response;
- Format the data in a way that it's easy to understand;
- This data represents the process flow real-time data.
AND NOW COMES THE REAL INPUT:
Document Flow Information:
<DocFlow>{ document_flow }</DocFlow>

---

In this example, the prompt template includes a placeholder {document_flow} which can be replaced with the extracted document flow dataset when assembling the prompt. The prompt template also includes instructions for the generative AI model on how to interpret the document flow dataset.

The generated prompt can be sent to the generative AI model, which can generate a response. In this example, the response output from the generative AI model can be directly passed from the API to the AI assistant for display on the user interface 600. For example, the response 620 is a summary of the document flow related to the sales order 24818, indicating that it has no preceding nor subsequent document, and some document details for the sales order 24818. Additionally, the API can send a navigation button 630 to the AI assistant for display, which allows the user to navigate (e.g., via link on the navigation button 630) to the document flow table for further details.

Figure 7:
FIG. 7 depicts a use case illustrating a user's request for document flow information related to another example sales order and the response generated by the ERP system.

To further illustrate, FIG. 7 shows another example of retrieving process flow information. Similarly, a user query 710 is entered in a user interface 700, requesting details about a document flow for another sales order 5415, and the response 720 generated by the ERP system provides a list of documents related to that sales order (only a partial list is shown in FIG. 7 and the user can scroll the user interface to view the remaining list).

Figure 8:
FIG. 8 depicts content of a document flow table related to the sales order of FIG. 8.

A document flow table 800 associated with the sales order 5415 is shown in FIG. 8. As shown, the document flow table 800 includes a list of documents (e.g., sales order, purchase order, outbound delivery, pricing request, etc.) arranged in a sequential order, where a selected document can have a preceding and/or subsequent document. The lists of documents can also be organized in a hierarchical structure. Each document can have a plurality of attributes (e.g., creation date and time, level of hierarchy, etc.).

Using the same data extraction and prompt assembly method described above, the API can prompt the generative AI model to generate the response 720 shown in FIG. 7, which lists the documents included in the document flow table 800 according to their sequential order, including relevant information of those documents.

Example Process for Changing Content of Objects

Figure 9:
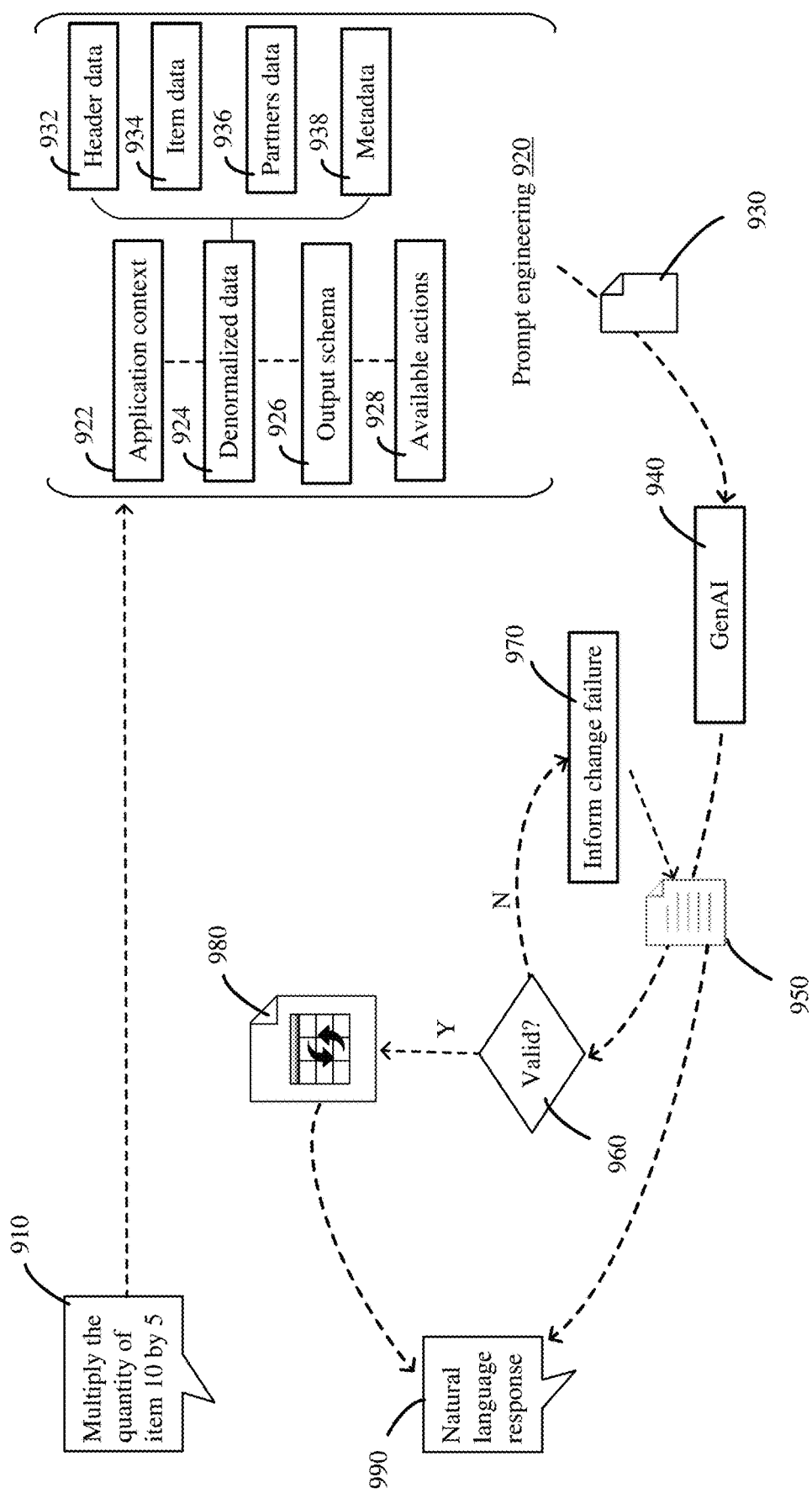
FIG. 9 is a flow diagram illustrating example stages of using generative AI to make changes to database tables on an ERP system in response to a user's change request.

In contrast to "read-only" operation modes such as sales order information retrieval or obtaining process flow information for a sales order, making changes to database tables (involving a "write" operation) represents an operation mode which requires a validation process. FIG. 9 shows a flow diagram illustrating example stages of using generative AI to make changes to database tables on an ERP system in response to a user's change request.

As shown, after receiving a user query 910 for making changes to content of a business object such as a sales order (e.g., multiple the quantity of item 10 by 5), an AI assistant of the ERP system can invoke a method call of an API, which can perform dynamic data extraction and prompt assembly (denoted as prompt engineering 920), similar to the examples described above.

As described above, the API can extract denormalized data 924 from database tables, e.g., header data 932 from a header table, line-items data 934 from an items table, and partners data 936 from a partners table. The extracted data can be enriched by metadata 938 extracted from a metadata store associated with the sales order. The extracted denormalized data 924 can be embedded into a prompt template specific to the operation mode for changing content of a sales order. The prompt template includes placeholders which can be replaced with the extracted denormalized data 924. Additionally, the prompt template can include application context 922 with instructions to the generative AI about specific tasks and rules, an output schema 926 defining format of the generative AI output, available actions 928 that the generative AI model is authorized to perform on the data.

The constructed prompt 930 can be sent to a generative AI model 940, which can generate a response 950. Despite the user query 910 for making specific changes, the generative AI model 940 does not actually make the changes to the sales order (e.g., for security and data integrity reasons). Instead, the response 950 from the generative AI model indicates what changes are suggested to be made for the sales order.

As shown, a validity check 960 can be performed to evaluate whether the suggested changes in the response 950 are valid. If it is determined that the suggested changes are valid, the suggested changes specified by in the response 950 are then implemented by the API to change the content of the sales order (e.g., increasing the quantity of item 10 by a factor of 5), resulting in an updated sales order 980. The ERP system can then generate a natural language response 990 to the user query 910, indicating that the requested changes are successfully completed. On the other hand, if the suggested changes are deemed invalid, the API can inform change failure 970. Specifically, the API can update relevant fields of the response 950, indicating that the user requested changes cannot be performed and the reason for the failed attempt. The API can return this updated response to the AI assistant, which can then generate the natural language response 990 reporting the change failure.

Example Use Cases for Changing Content of Objects

Figure 10:
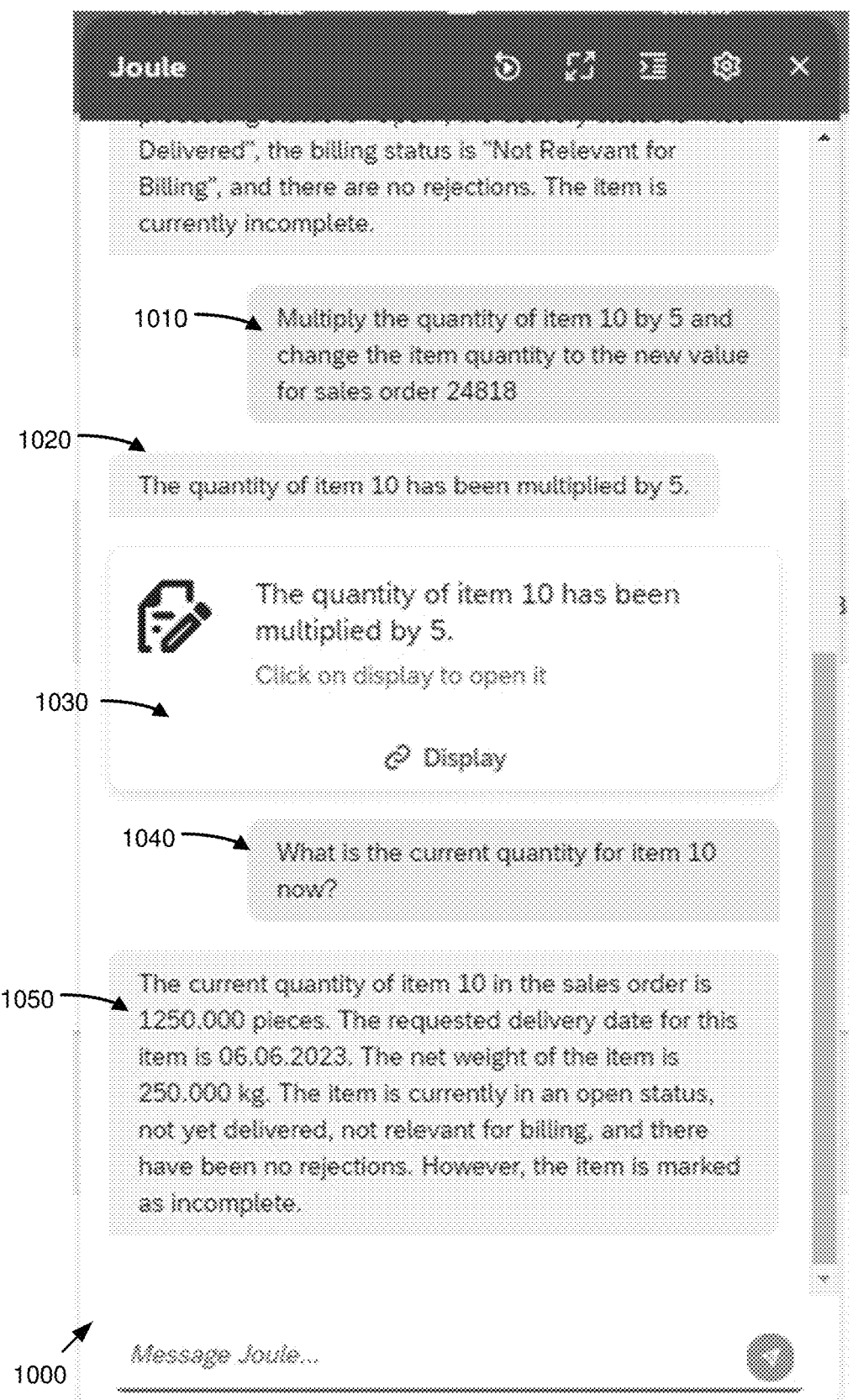
FIG. 10 depicts a use case illustrating a user's request to change the item quantity in an example sales order and the response generated by the ERP system.

As an example, FIG. 10 depicts a use case where a user requested change to a business object is successful.

As shown, after retrieving information about the sales order 24818 (see, e.g., FIG. 5), the user can enter a user query 1010 in a user interface 1000 of an ERP system, requesting to multiple the quantity of item 10 in the sales order 24818 by 5.

The AI assistant analyzes the user query 1010 to identify the intent (change content) and target object (sales order 24818). The AI assistant then invokes a method call of an API, passing the following JSON structure as an input to the API:

```
body: '{ "TaskFunction" : "Change",
    "SalesOrderID" : "24818",
    "UserQuery" : "Multiply the quantity of item
    10 by 5 and change the item
    quantity to the new value for sales order 24818",
    "CallGenAI" : true }'
```

Here, the field "TaskFunction" defines the operation mode of the API is for changing content of a sales order. For this operation mode, the API can dynamically extract data from database tables associated with the sales order 24818 that are relevant for the user requested changes.

Similar data extraction method can be used. For example, the API can extract the following header information:

```
SALES_DOCUMENT_ID_NC;REQUESTEDDELIVERYDATE;PURCHASEORDERB
YCUSTOMER;CUSTOMERPAYMENTTERMS;HEADERDELIVERYBLOCKREASO
N;DELIVERY_BLOCK_REASON_TEXT_NC;HEADERBILLINGBLOCKREASON;BI
LLING_BLOCK_REASON_TEXT_NC
0000024818;06.06.2023;Created via OData API;0004;;;04;Check Payment Terms
```

Likewise, the API can extract the following line-items data for item 10, i.e., the item whose quantity (250 in this example) the user wants to change:

```
ITEM_ID_NC;MATERIAL_NC;REQUESTED_QUANTITY;ITEMBILLINGBLOCKRE
ASON
000010;RAW311,PD;250.000 ;
```

Additionally, the API can extract relevant metadata associated with the sales order 24818. In this example, the extracted metadata includes a list of fields in the header table that cannot be changed, as follows:

```
SALES_DOCUMENT_ID_NC;DELIVERY_BLOCK_REASON_TEXT_NC;BILLING
BLOCK_REASON_TEXT_NC
```

The extracted metadata also includes a list of fields in the items table that cannot be changed, as follows:

```
ITEM_ID_NC;MATERIAL_NC
```

The API can then assemble a prompt by inserting the extracted data and metadata into a prompt template specific to the operation mode of changing content of a sales order. One example such prompt template is provided below:

```
Task: Generate a list of actions in JSON format, based on a natural language request string,
sales order data, and set of predefined actions. All items always refer to a single sales
document.
Each field in the table of order items has a location.
Each action is defined by an action ID and involves the sales order data
Additional rules:
- If an action ID cannot be determined, return "NONE".
- "Remark" field: Only used for the "NONE" action ID. It should provide a succinct
explanation (maximum 50 words) in the requested language.
- Return only the JSON, no additional explanations
```

```
- The operator in "Operations" field denotes how values will be modified. Possible
operators include: ADD, SUBTRACT, MULTIPLY, PERCENTAGE, SET VALUE,
NOT_POSSIBLE.
- "Infotext" field: Should provide a brief confirmation message (maximum 50 words) in the
requested language.
Fields that cannot be changed should return action ID NONE.
Actions:
- Action ID HEADER_CHANGE -- Only use to modify changeable fields in the header.
- Action ID ITEM_CHANGE -- Only use to modify changeable fields at the item level.
```

```
- Action ID INFO -- Use for answering questions about general information related the
order items and changeable fields.
- Action ID NONE -- Use when changes are not possible.
JSON Output Format: Ensure the output is a JSON object following this schema:
[:
    {"Result":
        "Action_ID": <value>,
        "Location": <value>,
        "Field_Name": <value>,
        "sales_document_ID": <value>,
        "item_ID": <value>,
        "value": <value>,
        "operation": <value>,
        "Infotext": <value>
    }
]
'** ###AND NOW COMES THE REAL INPUT:'.
Sales Order Header:
<Header>{ sales_order_header }</Header>
Sales Order Items:
<Items>{ sales_order_items }</Items>
Number of Items: < ItemCount> { number_of_items }</ItemCount>
THESE FIELDS CANNOT BE CHANGED:
Sales Order Header:
<NCHF>{ nc_header_fields }</NCHF>
Sales Order Item:
<NCIF>{ nc_item_fields }</NCIF>
User Question/Request:
<REQUEST>{ UserQuery }</REQUEST>
```

In this example, the prompt template includes instructions for the generative AI model about tasks and rules for making changes to a sales order. The prompt template also lists available actions (e.g., header change, item change, info, none) that the generative AI model is allowed to take. Additionally, the prompt template includes an output schema, which defines the output format of the generative AI to follow a specific JSON structure. The prompt template includes multiple placeholders, including the {sales_order_header}, {sales_order_items}, {number_of_items}, {nc_header_fields}, {nc_item_fields}, and {UserQuery}. Here, when assembling the prompt, the placeholder {nc_header_fields} is replaced by the extracted list of fields in the header table that cannot be changed, the placeholder {nc_item_fields} is replaced by the extracted list of fields in the items table that cannot be changed, and the placeholder {UserQuery} is replaced by the full text of the user query.

The assembled prompt can be sent to the generative AI model, which can generate a response. In this example, the response output from the generative AI model is formatted according to the JSON structure defined by the output schema, as follows:

```
[{
    "Result": {
        "Action_ID": "ITEM_CHANGE",
        "Location": "ITEM",
        "Field_Name": "REQUESTED_QUANTITY",
        "sales_document_ID": "0000024818",
        "item_ID": "000010",
        "value": "1250.0",
        "operation": "MULTIPLY",
        "Infotext": "The quantity of item 10 has been
        multiplied by 5."
    }
}]
```

In this example, the response of generative AI indicates the action ("Action_ID") is "ITEM CHANGE." The response also locates where the change will occur: the change is for the sales order 24818 (identified by "sales_document_ID"), located in the items table (identified by "Location"), the row for item 10 (identified by "item_ID"), and the column for quantity (identified by "Field_Name"). The response further indicates that a multiplication operator (identified by "operation") is applied to the item quantity and suggests changing the item quantity (identified by "value") to a new value "1250" (i.e., multiple 250 by 5). Additionally, the response includes a plain text message (identified by "Infotext"), which can be passed from the API to the AI assistant.

But at this point, the change operation has not been executed yet (i.e., the quantity of item 10 in the items table has not been updated). To effectuate the change, the suggested changes must be validated. For example, the API can evaluate if the requested data change involves a non-changeable field. In this example, the API determines that change of item quantity is allowed (because the item quantity is not one of the non-changeable fields extracted from the metadata store), thus the validation is deemed successful. Thus, the API can implement the changes suggested by the generative AI, changing the quantity of item 10 in the sales order 24818 from 250 to 1250. The API can then pass the JSON structure containing the generative AI response to the AI assistant, which can display the "Infotext" of the JSON structure as a plain text response 1020 in the user interface 1000. Additionally, the API can send a navigation button 1030 to the AI assistant for display, which allows the user to navigate (e.g., via link on the navigation button 1030) to the items table of the sales order 24818 for review the updated table information.

As shown, the user can enter a follow-up query 1040, and the API can use the query 1040 to directly prompt the generative AI model to ask for the updated quantity of item 10. The generative AI model can generate a response 1050 based on information it has acquired from processing the previous user queries.

Figure 11:
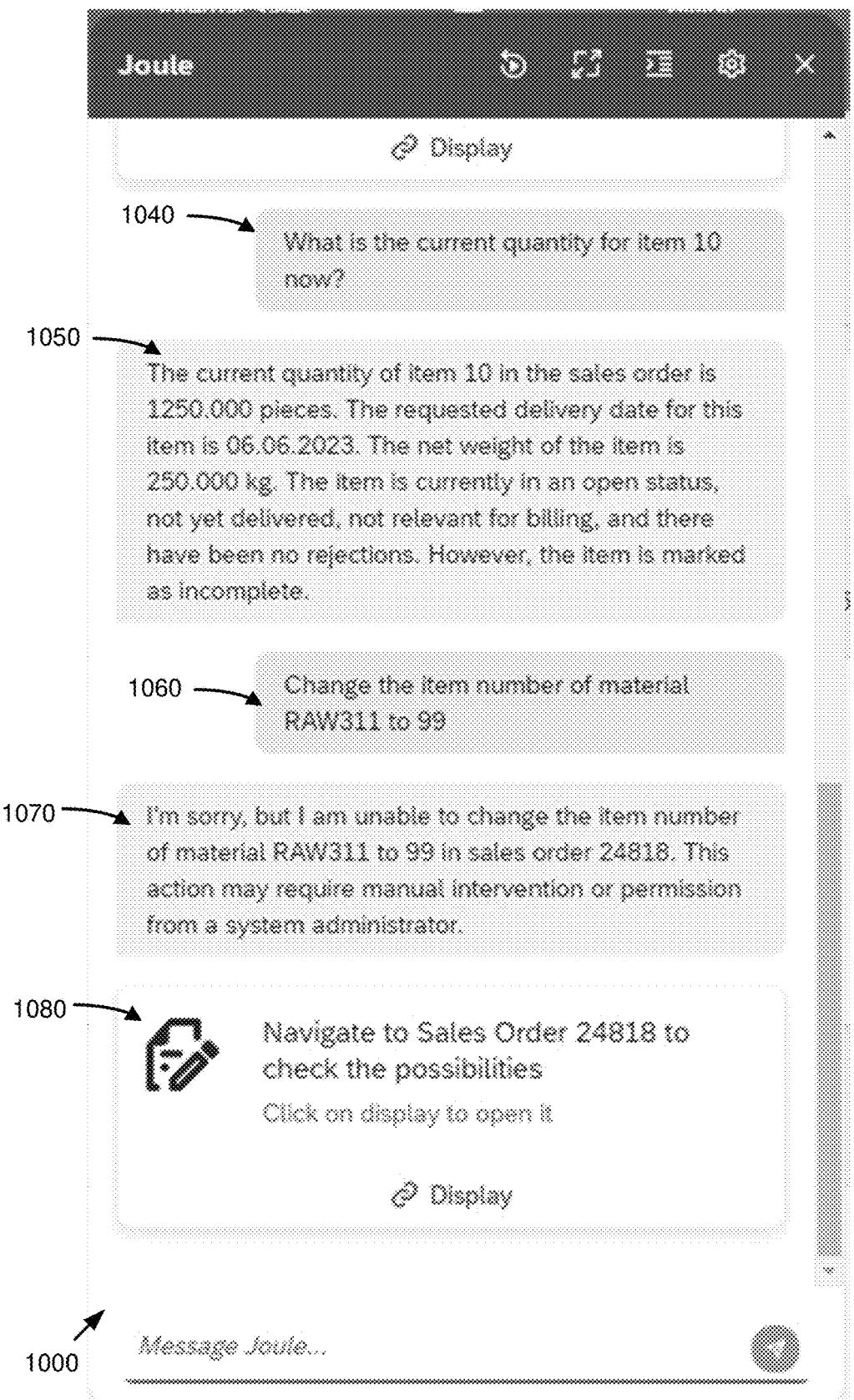
FIG. 11 depicts a use case illustrating a user's request to change the item number of a material and the response generated by the ERP system.

To further illustrate, FIG. 11 shows an example where the user enters another query 1060, requesting change the item number of a specific material ("RAW311") to 99.

In this example, the AI assistant calls the API by passing the following JSON structure as an input:

```
body: '{ "TaskFunction" : "Change",
    "SalesOrderID" : "24818",
    "UserQuery" : "Change the item number
    of the material RAW311 to 99",
    "CallGenAI" : true }'
```

The API can extract the same header information and relevant metadata associated with the sales order 24818 as described above. Similarly, the API can extract the following line-items data for item 10 (note that the item quantity is updated to 1250):

```
ITEM_ID_NC;MATERIAL_NC;REQUESTED_QUANTITY;ITEMBILLINGBLOCKRE
ASON
000010;RAW311,PD;1250.000 ;
```

Using the same prompt template described above (for the operation mode of changing content of a sales order), the API can assemble a new prompt by replacing the placeholders with extracted data/metadata (and with the full text of the new user query). Responsive to this new prompt, the generative AI model outputs the following response that is structured in JSON format:

```
[{
    "Result": {
        "Action_ID": "ITEM_CHANGE",
        "Location": "ITEM",
        "Field_Name": "ITEM_ID_NC",
        "sales_document_ID": "0000024818",
        "item_ID": "000010",
        "value": "000099",
        "operation": "SET VALUE",
        "Infotext": "The item number of material
```

-continued

```
        RAW311 has been changed to 99."
    }
}]
```

Different from the previous response of the generative AI model, this response indicates that the change is for the column or field corresponding to "ITEM_ID_NC." The response also indicates that the change operation is "SET VALUE" and that the item number ("value") will be set to 99. Additionally, the response includes a suggested message to the user ("Infotext"), assuming the item number of material RAW311 can be successfully changed to 99 per user's request.

However, the changes suggested by the generative AI will not take effect unless they are validated. In this example, the validation failed because the API determines that change of item number of material RAW311 is not allowed (note that ITEM_ID_NC is one of the non-changeable fields in the items table). Thus, the API will update the response of generative AI model to the following:

```
[{
  "Result": {
    "Action_ID": "NONE",
    "Location": "ITEM",
    "Field_Name": "ITEM_ID_NC",
    "sales_document_ID": "0000024818",
    "item_ID": "000010",
    "value": "000099",
    "operation": "SET VALUE",
    "Infotext": "I'm sorry, but I am unable to change the item number of material RAW311 to 99 in sales order 24818. This action may require manual intervention or permission from a system administrator."
  }
}]
```

Note that the "Action_ID" is now changed to "NONE" (indicating no change) and the "Infotext" is updated with a new natural language response (indicating the requested change cannot be implemented). In this case, the API will not update the items table because "Action_ID" is "NONE." The API will also pass the updated "Infotext" to the AI assistant, which will display it as a response 1070 on the user interface 1000. Similarly, the API can send a navigation button 1080 to the AI assistant for display, which allows the user to navigate (e.g., via link on the navigation button 1080) to the sales order to check for options.

Example Benefits of Using Standardized API Architecture

The standardized API architecture disclosed here significant benefits in both the implementation and usage stages of integrating generative AI with ERP systems.

During the implementation phase, the standardized API architecture can facilitate bulk purchasing of cloud resources and development tools, leading to economies of scale and significant cost reductions. It can also accelerate development times as developers become proficient with repeated experience, reducing learning curves and increasing speed. Regulatory approvals and security reviews can also be quicker for pre-approved designs, enabling organizations to complete projects swiftly and start new ones sooner. With repeated use, potential issues in the design can be identified and corrected, leading to higher overall quality. The standardized API architecture can also enhance scalability and flexibility, making it easier to expand API functionality and replicate successful projects in different environments with minimal adjustments. Further, it can improve communication between stakeholders, streamlining discussions about requirements and progress, and ensuring smoother project execution.

In terms of usage, the standardized API architecture can significantly enhance the efficiency of tasks such as generating sales order summaries. With generative AI, responses to user queries can be generated swiftly, eliminating the need for additional reviews and enhancing customer satisfaction. This approach can substantially reduce the time required for answering user's queries, thereby decreasing the total time spent on such tasks each day. This can result in a significant time savings for customer representatives, while simultaneously improving the customer experience.

Example Advantages

The technologies described herein offer several technical advantages.

First, the disclosed technologies enable a more seamless integration of generative AI into ERP systems. By dynamically retrieving data from database tables and metadata store, and embedding this information into prompt templates, the generative AI model can generate intelligent, contextually relevant responses to user queries. This not only enhances the generative AI model's understanding of the specific databases maintained by the ERP system, but also ensures that the generated outputs are aligned with the organization's data and business context.

Further, the disclosed technologies ensure that the AI's actions are in line with the system's data policies and security protocols. By configuring the prompts to prevent unintended user actions, the risk of data corruption can be significantly reduced. This is particularly important when users attempt to make changes to database tables via the generative AI, as certain modifications may be prohibited to maintain data integrity and adhere to security policies.

In addition, the technologies disclosed herein make complex tasks more accessible and intuitive for non-technical users. Users can interact with the ERP system using natural language, eliminating the need for extensive technical expertise. This allows organizations to automate content creation, improve customer interactions, and enhance decision-making processes, thereby increasing overall productivity and efficiency.

Moreover, the disclosed technologies provide a streamlined integration of generative AI capabilities, facilitating their use across diverse applications. By standardizing the semantic level of program-to-AI communication, these technologies enable technology-agnostic interaction with AI. This standardization not only accelerates the incorporation of AI capabilities into solutions but also ensures a homogeneous user experience by promoting consistent AI behavior across the system.

Example Computing Systems

Figure 12:
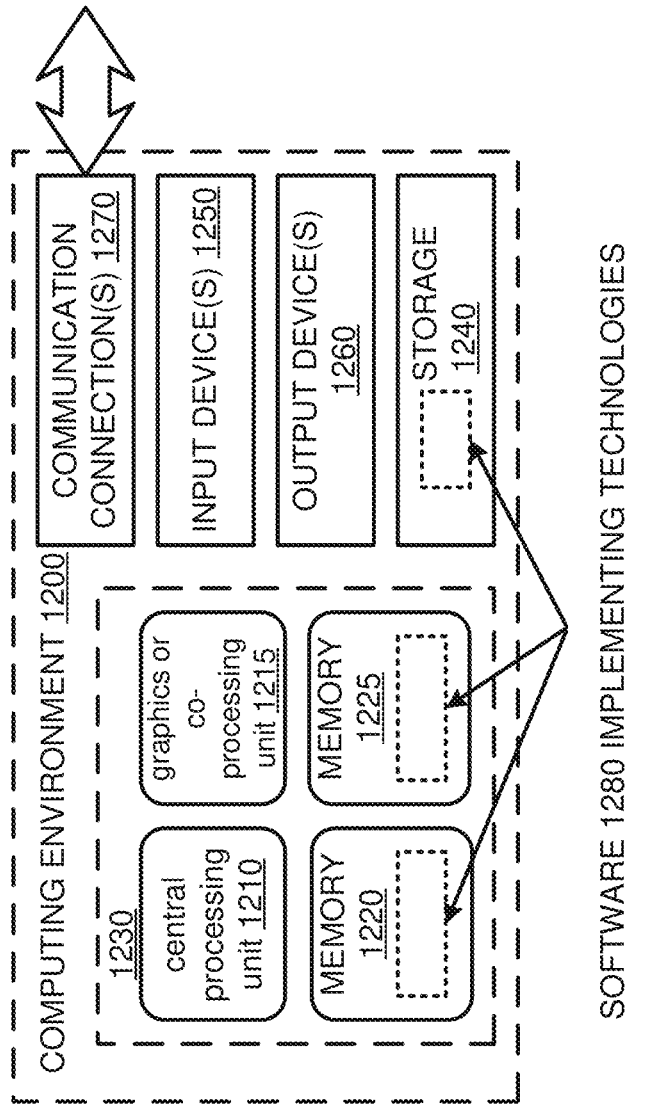
FIG. 12 is a block diagram of an example computing system in which described embodiments can be implemented.

FIG. 12 depicts an example of a suitable computing system 1200 in which the described innovations can be implemented. The computing system 1200 is not intended to suggest any limitation as to scope of use or functionality of the present disclosure, as the innovations can be implemented in diverse computing systems.

With reference to FIG. 12, the computing system 1200 includes one or more processing units 1210, 1215 and memory 1220, 1225. In FIG. 12, this basic configuration 1230 is included within a dashed line. The processing units 1210, 1215 can execute computer-executable instructions, such as for implementing the features described in the examples herein (e.g., the method 400). A processing unit can be a general-purpose central processing unit (CPU), processor in an application-specific integrated circuit (ASIC), or any other type of processor. In a multi-processing system, multiple processing units can execute computer-executable instructions to increase processing power. For example, FIG. 12 shows a central processing unit 1210 as well as a graphics processing unit or co-processing unit 1215. The tangible memory 1220, 1225 can be volatile memory (e.g., registers, cache, RAM), non-volatile memory (e.g., ROM, EEPROM, flash memory, etc.), or some combination of the two, accessible by the processing unit(s) 1210, 1215. The memory 1220, 1225 can store software 1280 implementing one or more innovations described herein, in the form of computer-executable instructions suitable for execution by the processing unit(s) 1210, 1215.

A computing system 1200 can have additional features. For example, the computing system 1200 can include storage 1240, one or more input devices 1250, one or more output devices 1260, and one or more communication connections 1270, including input devices, output devices, and communication connections for interacting with a user. An interconnection mechanism (not shown) such as a bus, controller, or network can interconnect the components of the computing system 1200. Typically, operating system software (not shown) can provide an operating environment for other software executing in the computing system 1200, and coordinate activities of the components of the computing system 1200.

The tangible storage 1240 can be removable or non-removable, and includes magnetic disks, magnetic tapes or cassettes, CD-ROMs, DVDs, or any other medium which can be used to store information in a non-transitory way and which can be accessed within the computing system 1200. The storage 1240 can store instructions for the software implementing one or more innovations described herein.

The input device(s) 1250 can be an input device such as a keyboard, mouse, pen, or trackball, a voice input device, a scanning device, touch device (e.g., touchpad, display, or the like) or another device that provides input to the computing system 1200. The output device(s) 1260 can be a display, printer, speaker, CD-writer, or another device that provides output from the computing system 1200.

The communication connection(s) 1270 can enable communication over a communication medium to another computing entity. The communication medium can convey information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the context of computer-executable instructions, such as those included in program modules, being executed in a computing system on a target real or virtual processor (e.g., which is ultimately executed on one or more hardware processors). Generally, program modules or components can include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

For the sake of presentation, the detailed description uses terms like "determine" and "use" to describe computer operations in a computing system. These terms are high-level descriptions for operations performed by a computer and should not be confused with acts performed by a human being. The actual computer operations corresponding to these terms vary depending on implementation.

Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing device to perform the method. The technologies described herein can be implemented in a variety of programming languages.

Example Cloud Computing Environment

Figure 13:
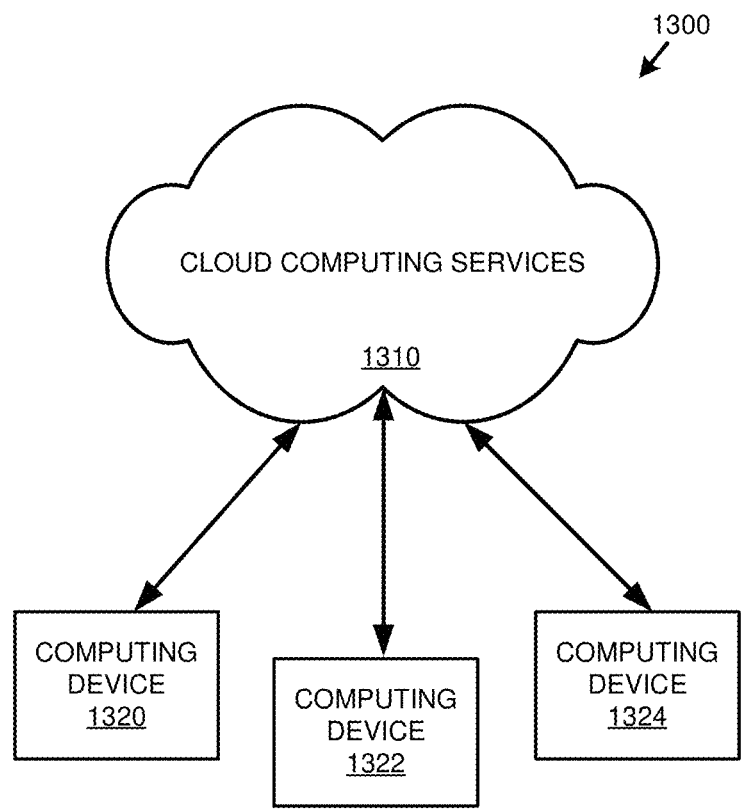
FIG. 13 is a block diagram of an example cloud computing environment that can be used in conjunction with the technologies described herein.

FIG. 13 depicts an example cloud computing environment 1300 in which the described technologies can be implemented, including, e.g., the system 100 and other systems herein. The cloud computing environment 1300 can include cloud computing services 1310. The cloud computing services 1310 can comprise various types of cloud computing resources, such as computer servers, data storage repositories, networking resources, etc. The cloud computing services 1310 can be centrally located (e.g., provided by a data center of a business or organization) or distributed (e.g., provided by various computing resources located at different locations, such as different data centers and/or located in different cities or countries).

The cloud computing services 1310 can be utilized by various types of computing devices (e.g., client computing devices), such as computing devices 1320, 1322, and 1324. For example, the computing devices (e.g., 1320, 1322, and 1324) can be computers (e.g., desktop or laptop computers), mobile devices (e.g., tablet computers or smart phones), or other types of computing devices. For example, the computing devices (e.g., 1320, 1322, and 1324) can utilize the cloud computing services 1310 to perform computing operations (e.g., data processing, data storage, and the like).

In practice, cloud-based, on-premises-based, or hybrid scenarios can be supported.

Example Implementations

In any of the examples herein, a software application (or "application") can take the form of a single application or a suite of a plurality of applications, whether offered as a service (SaaS), in the cloud, on premises, on a desktop, mobile device, wearable, or the like.

Although the operations of some of the disclosed methods are described in a particular, sequential order for convenient presentation, such manner of description encompasses rearrangement, unless a particular ordering is required by specific language set forth herein. For example, operations described sequentially can in some cases be rearranged or performed concurrently.

As described in this application and in the claims, the singular forms "a," "an," and "the" include the plural forms unless the context clearly dictates otherwise. Additionally, the term "includes" means "comprises." Further, "and/or" means "and" or "or," as well as "and" and "or."

Although specific prompt templates are described above, it should be understood that these prompt templates are merely examples for illustration purposes, and different prompt templates can be used based on the principles described herein.

In any of the examples described herein, an operation performed in runtime means that the operation can be completed in real time or with negligible processing latency (e.g., the operation can be completed within 1 second, etc.).

Example Clauses

Any of the following example clauses can be implemented.

Clause 1. A computing system with intelligent query response in an enterprise resource planning (ERP) system, the computing system comprising: memory; one or more hardware processors coupled to the memory; and one or more computer readable storage media storing instructions that, when loaded into the memory, cause the one or more hardware processors to perform operations comprising: receiving, from a user interface of an ERP system, a natural language user query for processing data of a target object maintained by the ERP system; invoking, in runtime, a function call through an application programming interface of the ERP system based on the natural language user query, wherein invoking the function call comprises: extracting, in runtime, denormalized data from one or more database tables associated with the target object; generating, in runtime, a prompt using a selected prompt template, wherein generating the prompt comprises replacing one or more parameters in the selected prompt template with the denormalized data retrieved from the one or more database tables; prompting, in runtime, a large language model using the prompt; and receiving a response generated by the large language model; and generating an output on the user interface of the ERP system based on the response generated by the large language model.

Clause 2. The computing system of clause 1, wherein extracting the denormalized data comprises replacing, in runtime, at least some attributes or data values stored in the one or more database tables with respective text descriptions from a metadata store associated with the one or more database tables.

Clause 3. The computing system of any one of clauses 1-2, wherein the operations further comprise determining, in runtime, an intent based on the natural language user query, wherein invoking the function call comprises setting an operation mode of the application programming interface of the ERP system, wherein the selected prompt template is specific to the operation mode.

Clause 4. The computing system of clause 3, wherein the operation mode is a first operation mode and the selected prompt template is a first prompt template, wherein extracting the denormalized data comprises retrieving a selected number of data records from at least one of the database tables in a delimiter-separated values format, wherein the first prompt template is configured to instruct the large language model to generate a summary based on the selected number of data records.

Clause 5. The computing system of clause 3, wherein the operation mode is a second operation mode and the selected prompt template is a second prompt template, wherein extracting the denormalized data comprises retrieving a data record specified in the user query from at least one of the database tables in a delimiter-separated values format, wherein the second prompt template is configured to instruct the large language model to update the data record according to an action specified in the user query.

Clause 6. The computing system of clause 5, wherein the second prompt template defines an output schema which instructs the large language model to generate the response in a data exchange object comprising a plurality of key-value pairs in text format, wherein the plurality of key-value pairs specifies an updated data record based on the action.

Clause 7. The computing system of clause 6, wherein invoking the function call further comprises determining a validity of the action based on attributes of the data record.

Clause 8. The computing system of clause 7, wherein invoking the function call further comprises responsive to determining the action is valid, replacing the data record in the at least one of the database tables with the updated data record.

Clause 9. The computing system of any one of clauses 7-8, wherein invoking the function call further comprises responsive to determining the action is invalid, revising the data exchange object to indicate that the action cannot be completed.

Clause 10. The computing system of clause 3, wherein the operation mode is a third operation mode and the selected prompt template is a third prompt template, wherein extracting the denormalized data comprises retrieving one or more objects from a process flow table which defines a sequential order of the one or more objects, wherein the target object is one of the one or more objects stored in the process flow table, wherein the third prompt template is configured to instruct the large language model to list the one or more objects according to the sequential order.

Clause 11. A computer-implemented method for intelligent query response in an enterprise resource planning (ERP) system, the method comprising: receiving, from a user interface of an ERP system, a natural language user query for processing data of a target object maintained by the ERP system; invoking, in runtime, a function call through an application programming interface of the ERP system based on the natural language user query, wherein invoking the function call comprises: extracting, in runtime, denormalized data from one or more database tables associated with the target object; generating, in runtime, a prompt using a selected prompt template, wherein generating the prompt comprises replacing one or more parameters in the selected prompt template with the denormalized data retrieved from the one or more database tables; prompting, in runtime, a large language model using the prompt; and receiving a response generated by the large language model; and generating an output on the user interface of the ERP system based on the response generated by the large language model.

Clause 12. The computer-implemented method of clause 11, wherein extracting the denormalized data comprises replacing, in runtime, at least some attributes or data values stored in the one or more database tables with respective text descriptions from a metadata store associated with the one or more database tables.

Clause 13. The computer-implemented method of any one of clauses 11-12, further comprising determining, in runtime, an intent based on the natural language user query, wherein invoking the function call comprises setting an operation mode of the application programming interface of the ERP system, wherein the selected prompt template is specific to the operation mode.

Clause 14. The computer-implemented method of clause 13, wherein the operation mode is a first operation mode and the selected prompt template is a first prompt template, wherein extracting the denormalized data comprises retrieving a selected number of data records from at least one of the database tables in a delimiter-separated values format, wherein the first prompt template is configured to instruct the large language model to generate a summary based on the selected number of data records.

Clause 15. The computer-implemented method of clause 13, wherein the operation mode is a second operation mode and the selected prompt template is a second prompt template, wherein extracting the denormalized data comprises retrieving a data record specified in the user query from at least one of the database tables in a delimiter-separated values format, wherein the second prompt template is configured to instruct the large language model to update the data record according to an action specified in the user query.

Clause 16. The computer-implemented method of clause 15, wherein the second prompt template defines an output schema which instructs the large language model to generate the response in a data exchange object comprising a plurality of key-value pairs in text format, wherein the plurality of key-value pairs specifies an updated data record based on the action.

Clause 17. The computer-implemented method of clause 16, wherein invoking the function call further comprises determining a validity of the action based on attributes of the data record.

Clause 18. The computer-implemented method of clause 17, wherein invoking the function call further comprises responsive to determining the action is valid, replacing the data record in the at least one of the database tables with the updated data record.

Clause 19. The computer-implemented method of any one of clauses 17-18, wherein invoking the function call further comprises responsive to determining the action is invalid, revising the data exchange object to indicate that the action cannot be completed.

Clause 20. One or more non-transitory computer-readable media having encoded thereon computer-executable instructions causing one or more processors to perform a method for intelligent query response in an enterprise resource planning (ERP) system, the method comprising: receiving, from a user interface of an ERP system, a natural language user query for processing data of a target object maintained by the ERP system; invoking, in runtime, a function call through an application programming interface of the ERP system based on the natural language user query, wherein invoking the function call comprises: extracting, in runtime, denormalized data from one or more database tables associated with the target object; generating, in runtime, a prompt using a selected prompt template, wherein generating the prompt comprises replacing one or more parameters in the selected prompt template with the denormalized data retrieved from the one or more database tables; prompting, in runtime, a large language model using the prompt; and receiving a response generated by the large language model; and generating an output on the user interface of the ERP system based on the response generated by the large language model.

Example Alternatives

The technologies from any example can be combined with the technologies described in any one or more of the other examples. In view of the many possible embodiments to which the principles of the disclosed technology can be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system with intelligent query response in an enterprise resource planning (ERP) system, the computing system comprising:
   memory;
   one or more hardware processors coupled to the memory; and
   one or more computer readable storage media storing instructions that, when loaded into the memory, cause the one or more hardware processors to perform operations comprising:
   receiving, from a user interface of an ERP system, a natural language user query for processing data of a target object maintained by the ERP system;
   determining, in runtime, an intent based on the natural language user query;
   invoking, in runtime, a function call through an application programming interface of the ERP system based on the natural language user query, wherein invoking the function call comprises:
     extracting, in runtime, denormalized data from one or more database tables associated with the target object;
     generating, in runtime, a prompt using a selected prompt template, wherein generating the prompt comprises replacing one or more parameters in the selected prompt template with the denormalized data retrieved from the one or more database tables;
     prompting, in runtime, a large language model using the prompt; and
     receiving a response generated by the large language model; and
   generating an output on the user interface of the ERP system based on the response generated by the large language model,
   wherein extracting the denormalized data comprises replacing, in runtime, at least some attributes or data values stored in the one or more database tables with respective text descriptions from a metadata store associated with the one or more database tables,
   wherein invoking the function call comprises setting an operation mode of the application programming interface of the ERP system, wherein the selected prompt template is specific to the operation mode.

2. The computing system of claim 1, wherein the operation mode is a first operation mode and the selected prompt template is a first prompt template, wherein extracting the denormalized data comprises retrieving a selected number of data records from at least one of the database tables in a delimiter-separated values format, wherein the first prompt template is configured to instruct the large language model to generate a summary based on the selected number of data records.

3. The computing system of claim 1, wherein the operation mode is a second operation mode and the selected prompt template is a second prompt template, wherein extracting the denormalized data comprises retrieving a data record specified in the user query from at least one of the database tables in a delimiter-separated values format, wherein the second prompt template is configured to instruct the large language model to update the data record according to an action specified in the user query.

4. The computing system of claim 3, wherein the second prompt template defines an output schema which instructs the large language model to generate the response in a data exchange object comprising a plurality of key-value pairs in text format, wherein the plurality of key-value pairs specifies an updated data record based on the action.

5. The computing system of claim 4, wherein invoking the function call further comprises determining a validity of the action based on attributes of the data record.

6. The computing system of claim 5, wherein invoking the function call further comprises responsive to determining the action is valid, replacing the data record in the at least one of the database tables with the updated data record.

7. The computing system of claim 5, wherein invoking the function call further comprises responsive to determining the action is invalid, revising the data exchange object to indicate that the action cannot be completed.

8. The computing system of claim 1, wherein the operation mode is a third operation mode and the selected prompt template is a third prompt template, wherein extracting the denormalized data comprises retrieving one or more objects from a process flow table which defines a sequential order of the one or more objects, wherein the target object is one of the one or more objects stored in the process flow table, wherein the third prompt template is configured to instruct the large language model to list the one or more objects according to the sequential order.

9. A computer-implemented method for intelligent query response in an enterprise resource planning (ERP) system, the method comprising:
  receiving, from a user interface of an ERP system, a natural language user query for processing data of a target object maintained by the ERP system;
  determining, in runtime, an intent based on the natural language user query;
  invoking, in runtime, a function call through an application programming interface of the ERP system based on the natural language user query, wherein invoking the function call comprises:
    extracting, in runtime, denormalized data from one or more database tables associated with the target object;
    generating, in runtime, a prompt using a selected prompt template, wherein generating the prompt comprises replacing one or more parameters in the selected prompt template with the denormalized data retrieved from the one or more database tables;
    prompting, in runtime, a large language model using the prompt; and
    receiving a response generated by the large language model; and
  generating an output on the user interface of the ERP system based on the response generated by the large language model, wherein extracting the denormalized data comprises replacing, in runtime, at least some attributes or data values stored in the one or more database tables with respective text descriptions from a metadata store associated with the one or more database tables,
wherein invoking the function call comprises setting an operation mode of the application programming interface of the ERP system, wherein the selected prompt template is specific to the operation mode.

10. The computer-implemented method of claim 9, wherein the operation mode is a first operation mode and the selected prompt template is a first prompt template, wherein extracting the denormalized data comprises retrieving a selected number of data records from at least one of the database tables in a delimiter-separated values format, wherein the first prompt template is configured to instruct the large language model to generate a summary based on the selected number of data records.

11. The computer-implemented method of claim 9, wherein the operation mode is a second operation mode and the selected prompt template is a second prompt template, wherein extracting the denormalized data comprises retrieving a data record specified in the user query from at least one of the database tables in a delimiter-separated values format, wherein the second prompt template is configured to instruct the large language model to update the data record according to an action specified in the user query.

12. The computer-implemented method of claim 11, wherein the second prompt template defines an output schema which instructs the large language model to generate the response in a data exchange object comprising a plurality of key-value pairs in text format, wherein the plurality of key-value pairs specifies an updated data record based on the action.

13. The computer-implemented method of claim 12, wherein invoking the function call further comprises determining a validity of the action based on attributes of the data record.

14. The computer-implemented method of claim 13, wherein invoking the function call further comprises responsive to determining the action is valid, replacing the data record in the at least one of the database tables with the updated data record.

15. The computer-implemented method of claim 13, wherein invoking the function call further comprises responsive to determining the action is invalid, revising the data exchange object to indicate that the action cannot be completed.

16. One or more non-transitory computer-readable media having encoded thereon computer-executable instructions causing one or more processors to perform a method for intelligent query response in an enterprise resource planning (ERP) system, the method comprising:
  receiving, from a user interface of an ERP system, a natural language user query for processing data of a target object maintained by the ERP system;
  determining, in runtime, an intent based on the natural language user query;
  invoking, in runtime, a function call through an application programming interface of the ERP system based on the natural language user query, wherein invoking the function call comprises:
    extracting, in runtime, denormalized data from one or more database tables associated with the target object;
    generating, in runtime, a prompt using a selected prompt template, wherein generating the prompt comprises replacing one or more parameters in the selected prompt template with the denormalized data retrieved from the one or more database tables;

prompting, in runtime, a large language model using the prompt; and receiving a response generated by the large language model; and generating an output on the user interface of the ERP system based on the response generated by the large language model, wherein extracting the denormalized data comprises replacing, in runtime, at least some attributes or data values stored in the one or more database tables with respective text descriptions from a metadata store associated with the one or more database tables, wherein invoking the function call comprises setting an operation mode of the application programming interface of the ERP system, wherein the selected prompt template is specific to the operation mode.

* * * * *